(12) United States Patent
Schmidt et al.

(10) Patent No.: US 9,338,811 B2
(45) Date of Patent: May 10, 2016

(54) METHODS AND APPARATUS FOR PROVIDING SELECTIVE ACCESS TO WIRELESS NETWORK RESOURCES USING DETAILED INFORMATION

(75) Inventors: Andreas Schmidt, Braunschweig (DE); Martin Hans, Bad Salzdetfurth (DE); Maik Bienas, Braunschweig (DE)

(73) Assignee: APPLE INC., Cupertino, CA (US)

( * ) Notice: Subject to any disclaimer, the term of this patent is extended or adjusted under 35 U.S.C. 154(b) by 1146 days.

(21) Appl. No.: 12/399,588

(22) Filed: Mar. 6, 2009

(65) Prior Publication Data
US 2010/0227611 A1  Sep. 9, 2010

(51) Int. Cl.
*H04W 4/00* (2009.01)
*H04W 76/02* (2009.01)
*H04W 4/06* (2009.01)
*H04W 16/32* (2009.01)
*H04W 84/04* (2009.01)

(52) U.S. Cl.
CPC .............. *H04W 76/025* (2013.01); *H04W 4/06* (2013.01); *H04W 16/32* (2013.01); *H04W 84/045* (2013.01)

(58) Field of Classification Search
CPC ... H04W 76/025; H04W 4/06; H04W 84/045; H04W 16/32
USPC ................. 370/312–315, 328, 338; 455/411, 455/414.2, 422.1, 440, 444
See application file for complete search history.

(56) References Cited

U.S. PATENT DOCUMENTS

| 2002/0058516 | A1* | 5/2002 | Amin | 455/455 |
|---|---|---|---|---|
| 2007/0091882 | A1* | 4/2007 | Moon et al. | 370/389 |
| 2008/0267153 | A1* | 10/2008 | Mukherjee et al. | 370/338 |
| 2009/0061878 | A1* | 3/2009 | Fischer | 455/436 |
| 2010/0034160 | A1* | 2/2010 | Prakash | H04W 68/02 370/329 |
| 2010/0240397 | A1* | 9/2010 | Buchmayer et al. | 455/456.1 |
| 2010/0265867 | A1* | 10/2010 | Becker et al. | 370/312 |
| 2010/0329167 | A1* | 12/2010 | Linden et al. | 370/312 |

OTHER PUBLICATIONS

3GPP TR 25.820: "3G Home Node B Study Item Technical Report" v8.0.0 (Release 8).
3GPP TS 22.146: "Multimedia Broadcast/Multicast Service (MBMS); Stage 1" (Release 8).
3GPP TS 23.246: "Multimedia Broadcast/Multicast Service (MBMS); Architecture and functional description" (Release 8).

(Continued)

*Primary Examiner* — Kan Yuen
(74) *Attorney, Agent, or Firm* — Fay Kaplun & Marcin, LLP

(57) ABSTRACT

Methods and apparatus for providing enhanced access options for wireless access points (e.g., cellular femtocells). These access options in one embodiment include various grades or levels of private and public access to available femtocell services. Each service may be separately assigned a various access type, such that a femtocell may service multiple users both within the "closed" group authorized by the femtocell white list, and non-members. In one variant, a femtocell broadcasts enhanced system information to all terminals (regardless of member/non-member status) such that a non-CSG (Closed Subscriber Group) member terminal or UE is capable of obtaining partial service access within the femtocell. Broadcast multimedia or other services can be delivered to both CSG members and non-members, advantageously without having to establish a dedicated connection for the non-member users.

20 Claims, 14 Drawing Sheets

(56) References Cited

OTHER PUBLICATIONS

3GPP TS 25.346: "Introduction of the Multimedia Broadcast/Multicast Service (MBMS) in the Radio Access Network (RAN); Stage 2" (Release 8).
3GPP TS 25.992: "Multimedia Broadcast Multicast Service (MBMS); UTRAN/GERAN Requirements" V 7.0.0.
3GPP TS 43.246: "Multimedia Broadcast/Multicast Service (MBMS) in the GERAN; Stage 2" (Release 8).
3GPP TR 25.803: "S-CCPCH performance for Multimedia Broadcast/Multicast Service (MBMS)" (Release 6).
3GPP TS 22.246: "Multimedia Broadcast/Multicast Service (MBMS) user services; Stage 1" (Release 8).
3GPP TS 26.346: "Multimedia Broadcast/Multicast Service (MBMS); Protocols and codecs" (Release 8).
3GPP TR 26.946: "Multimedia Broadcast/Multicast Service (MBMS) user service guidelines" (Release 8).
3GPP TS 33.246: "3G Security; Security of Multimedia Broadcast/Multicast Service (MBMS)" (Release 8).
3GPP TS 32.273: "Telecommunication management; Charging management; Multimedia Broadcast and Multicast Service (MBMS) charging" (Release 8).
3GPP TS 36.331: "E-UTRA Radio Resource Control (RRC) Protocol", v8.2.0 (Release 8).
3GPP TS 36.300: "E-UTRA and E-UTRAN Overall Description"; Stage 2, v8.2.0 (Release 8).

* cited by examiner

- cellAccessRelatedInformation    SEQUENCE                                                         804
  - plmn-IdentityList              SEQUENCE (1..6)
    - plmn-Identity                 PLMN Identity
    - cellReservedForOperatorUse    ENUMERATED {reserved, notReserved}
  - trackingAreaCode               Tracking Area Code
  - cellIdentity                   Cell Identity
  - cellBarred                     ENUMERATED {barred, notBarred}
  - intraFrequencyCellReselection  BOOLEAN
  - cellReservationExtension       ENUMERATED {reserved, notReserved}    808
  - csg-Indication                 BOOLEAN
  - csg-partially-open             BOOLEAN
  - csg-open-services-info         SEQUENCE (1..maxServices)
    - service-type                  ENUMERATED {MBMS, ...}
    - service-details               ENUMERATED {sports, news, politics, music, ...}
    - validity                      ENUMERATED {min 10, min 20, min 30, and unlimited}
- cellSelectionInfo               SEQUENCE
  - q-Rxlevmin                     INTEGER (-60..-28)
  - q-Rxlevminoffset               INTEGER (1..8)
- frequencyBandIndicator          INTEGER (1..64),
- schedulinInformation            SEQUENCE (1..maxSI-Message)
  - si-Periodicity                 ENUMERATED {ms80, ms160, ms320, ..., ms5120}
  - sib-MappingInfo                SEQUENCE (1..maxSIB) OF SIB-Type
- tdd-Configuration               TDD-Configuration
- si-WindowLength                 ENUMERATED
- systemInformationValueTag       INTEGER
- mbsfn-subframeConfiguration     SEQUENCE
  - radioframeAllocation           SEQUENCE
  - subframeAllocation             INTEGER (1..7)

FIG. 8A

METHODS AND APPARATUS FOR PROVIDING SELECTIVE ACCESS TO WIRELESS NETWORK RESOURCES USING DETAILED INFORMATION

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication and networks. More particularly, in one exemplary aspect, the present invention is directed to methods and apparatus for providing various levels of access to a femtocell or other network resource operating within a public network.

2. Description of Related Technology

The Universal Mobile Telecommunications System (UMTS) is an exemplary implementation of a "third-generation" or "3G" cellular telephone technology. The UMTS standard is specified by a collaborative body referred to as the $3^{rd}$ Generation Partnership Project (3GPP). The 3GPP has adopted UMTS as a 3G cellular radio system targeted for inter alia European markets, in response to requirements set forth by the International Telecommunications Union (ITU). The ITU standardizes and regulates international radio and telecommunications.

A current topic in the 3GPP standardization committees is the further development of 3G UMTS towards a mobile radio communication system optimized for packet data transmission by improving both system capacity and spectral efficiency. In 3GPP, the activities in this regard are summarized under the general term LTE (Long Term Evolution). The aim for this future technology is, among others, to significantly increase the maximum net transmission rate, namely to 100 Mbps in the downlink transmission direction (base station to cellular phone) and to 50 Mbps in the uplink transmission direction (cellular phone to base station). Various techniques have been specified to improve transmission via the air interface.

Multiple Input Multiple Output (MIMO) is one such technique proposed for LTE. MIMO is an antenna technology in which up to four (4) antennas (the maximum number of antennas specified for LTE) are used at both the base station and user terminal. MIMO supports multiple independent data streams transmitting in parallel using the same time-frequency resources. Spatial division multiplexing is applied to distinguish the data streams at the receiver (e.g. each path traverses a different path, and is susceptible to different channel effects).

Another technology utilized in UMTS (and most likely in future versions of LTE) is Multimedia Broadcast Multicast Services (MBMS). While MBMS is generally considered a downlink only service (akin to digital television), the MBMS infrastructure does enable uplink channels for interaction between the service provider and subscriber/user. Logically, MBMS uses multicast distribution in the Core Network (instead of point-to-point links for each end device), to efficiently distribute data. Multicast and broadcast distribution technologies may advantageously reuse radio resources (e.g. time slots, frequency bands, etc.), and Radio Resource Connections (RRC) to service multiple users. MBMS technology is described in greater detail subsequently herein.

In addition to radio technology research related to increasing capacity and bandwidth, 3GPP has also promoted the development of so-called "femtocell" technology. The cost of purchasing fixed base stations (BS, also known as "macrocells") and their associated maintenance in a wireless network is comparatively high. Femtocells, on the other hand, are smaller more inexpensive cellular base stations purchased by a home, small office, or other premises user. Network providers may even subsidize the cost of a femtocell to such users, thereby making them more attractive to the user from a financial perspective.

A femtocell augments the service provider's existing network of base stations by connecting to the service provider's network via a broadband interface (such as DSL, T1, ISDN, or DOCSIS cable modem). Due to the smaller size and lower cost of a femtocell, they can be utilized in areas which are otherwise not feasibly serviced through standard base station deployments (e.g., by extension of indoor service coverage, or temporary service coverage). They also may be somewhat portable in nature, and accordingly be repositioned when desired with fairly minimal effort. Various aspects of femtocells are described in greater detail subsequently herein.

Currently, the standardization body for mobile communication (3GPP) is specifying a new network femtocell element known as "Home Node B" (HNB). A Home Base Station (or Home NodeB, or Home eNodeB in 3GPP terminology) is a femtocell optimized for use in residential, corporate, or similar environments (e.g., private homes, public restaurants, small offices, enterprises, hospitals, etc., and hence the term "home" is not meant to be limiting to residential applications). In the present context, the terms "Home Base Station", "Home NodeB" (for UMTS), "Home eNodeB" (for LTE), and "femtocell" refer to the same logical entity, and are used interchangeably unless otherwise noted.

The 3GPP is currently researching possible solutions for supporting the deployment of HNBs for the following radio access technologies: 3G UMTS (UMTS solutions are based on CDMA and referred to as UMTS Terrestrial Radio Access (UTRA) in 3GPP terminology), and 3.9G LTE (Long Term Evolution solutions are referred to as Evolved-UTRA (E-UTRA) in 3GPP terminology).

In one exemplary usage case, a user of a mobile phone or other User Equipment (UE) might wish to augment their wireless coverage by deploying a HNB in their premises (e.g., apartment). In one scenario, the user employs a DSL or other such connection to connect the HNB to the operator's Core Network. The usage is beneficial for both operator and user; from the customer's perspective, HNBs offer the seamless operation of a single mobile handset with a built-in personal phonebook for all calls, whether at home or elsewhere. The user maintains only one contract and one bill with the service provider. The user also benefits from the improved indoor network coverage, as well as increased traffic throughput capabilities.

Furthermore, the user's mobile phone will have a longer standby battery life when the phone is used indigenously; power consumption can be reduced due to the improved radio link quality (i.e. improved Signal to Noise Ratio (SNR)) which can be expected to be better than that of the link between the handset and legacy 'Node B' located farther (e.g., a few hundred meters or more) away.

The network operator also obtains additional network coverage area (see, e.g., 3GPP TR 25.820, "3G Home Node B Study Item Technical Report" v100 (Release 8), which is incorporated herein by reference in its entirety).

Finally, both the home user and the network operator can fully utilize cellular equipment technology improvements, independent of the larger network capabilities and requirements for infrastructure upgrade.

The simplicity of HNB operation for the home user creates some unique challenges for network operators. Prior to the deployment of femtocells, base station networks were planned and controlled entirely by the network operator. Network access functions such as security and authorization were easily controlled by a network operator through base station fixtures. However, the "randomized user distribution" of HNBs significantly complicates fixed base station network operations.

The "Closed Subscriber Group" (CSG) capability is one specific example of the new complexities introduced by HNB operation within existing UMTS cellular networks. Usually access to a HNB will be allowed for a closed user group; e.g., service offerings of a particular cell may be restricted to employees of a certain company, members of a given family, etc. The general concept of restricting service offerings of femtocells (and base stations) is termed Closed Subscriber Group Cells (CSG Cells) in the context of the 3GPP Standards. CSG technology is described in greater detail subsequently herein.

Closed Subscriber Groups are often a necessity to provide sufficient incentive home/small business users to at least partially subsidize the cost of new technologies, e.g. deployments of HNBs, etc. That is, a prospective HNB user will want "user exclusivity" in exchange for their financial and/or other contributions to setting up and operating the HNB. However, currently proposed implementations of CSG Cells in certain circumstances are overly restrictive, and may prove detrimental to overall network resources, especially with certain types of multimedia services, and/or service capabilities. For example, a UE denied HNB access to the desired (e.g., MBMS) service would then require allocation of network resources that would not otherwise have to be allocated were access to the HNB made less restrictive.

Therefore, greater flexibility in access control for use with heterogeneous access networks (e.g., having both public or "open", and private or "closed" group access) is desirable for public cellular networks (e.g., UMTS/LTE) and femtocells (e.g., HNBs/eHNBs). Prior art solutions for cellular networks are not adequate when applied to the operation of closed cell groups within the network. Some solutions which have been implemented for other communications networks use localized methods for authentication and authorization; this may be undesirable for cellular network providers, which prefer to maintain a single global logical entity for such procedures. Furthermore, other solutions have required additional software or hardware (such as specialized identities or priority classes), which are also not desirable for femtocell usage, as they require interaction with the public network resources (such as to authorize validity of the user), in addition to private network resources (e.g., to evaluate the specialized identities/priority), thereby making the process unduly complex and burdensome.

Hence, improved solutions are needed to provide sufficient access control solutions for use within heterogeneous access networks, while still maintaining the benefits of exclusivity offered by CSG cell capabilities and leveraging femtocell flexibility. Such improved solutions would ideally operate within existing cellular networks without requiring significant software or hardware changes, and remain compatible with existing network infrastructure and currently serviced user equipment (UE); i.e., "backwards compatibility".

SUMMARY OF THE INVENTION

The present invention satisfies the foregoing needs by providing, inter alia, methods and apparatus for providing various levels of access to a femtocell or other network resource operating within a public network.

In a first aspect of the invention, a method of receiving data from a first base station at a mobile terminal is disclosed. In one embodiment, the method includes: placing the terminal within coverage of the first base station and of a second base station; receiving at least one broadcast service without establishment of a radio resource connection to the first base station; and utilizing the second base station for all other telecommunication services that may require a radio resource connection.

In one variant, the radio resource connection is an RRC connection, and the services that may require an RRC connection are services that require an RRC Connected Mode.

In another variant, the mobile terminal maintains an RRC connection to the second base station while at the same time receiving the broadcast service via the first base station without any RRC connection.

In a further variant, the first base station includes a femtocell, and is configured with access restrictions. The second base station includes for instance a macro cell.

In another variant the method includes receiving at the mobile terminal information about the availability of broadcast services via the first base station.

In yet another variant, the mobile terminal performs at least one of: (i) submitting a service request to the second base station, the request pertaining to the consumption of broadcast data; and (ii) receiving a referral from the second base station to the first base station for the purpose of receiving the requested broadcast services.

In a second aspect of the invention, a method of broadcasting data via a first base station to a mobile terminal is disclosed. In one embodiment, the mobile terminal is within the overlapping coverage area of a first base station and a second base station, and the method includes: broadcasting the data from the first base station; transmitting one or more information elements from the first or second base station to the mobile terminal; causing the mobile terminal to receive the broadcasted data responsive to receipt of the one or more information elements; and contemporaneously therewith, maintaining a communication link between the mobile terminal and the second base station.

In one variant, the mobile terminal is sent the broadcasted data from the first base station without a Radio Resource Control (RRC) connection.

In another variant, the first base station includes a femtocell, and supports Closed Subscriber Group (CSG) limitations. The second base station includes for instance a macrocell.

In a further variant, the method also includes receiving a service request from the mobile terminal at the second base station; and referring the mobile terminal to the broadcast data transmitted by the first base station.

In a third aspect of the invention, a method of operating a closed group asset of a wireless network so as to provide one or more services to users which are not part of the closed group is disclosed. In one embodiment, the method includes: classifying the one or more services according to a classification scheme; providing one of the one or more services to at least one user terminal which is not associated with a member of the closed group; and serving or not serving the classified one or more services to the user based at least in part on the classification scheme.

In one variant, the closed group asset includes an HNB, and the network includes an UMTS-compliant network.

In one variant, the closed group asset includes an HeNB, and the network includes an LTE-compliant network.

In another variant, the classification scheme includes a scheme having at least private and partial public access levels, and serving or not serving includes serving when the classified one or more services comprise services classified according to the partial public access level.

In a further variant, serving includes providing the classified one or more services without establishing a new resource connection to support the classified one or more services. Alternatively, serving includes providing access to an existing Multimedia Broadcast Multicast Service (MBMS) compliant broadcast to at least the user terminal (including e.g., instantiating a new Multimedia Broadcast Multicast Service (MBMS) compliant broadcast and providing access thereto to at least the user terminal).

In a fourth aspect of the invention, a method of providing information regarding one or more services available via a closed-group wireless network resource is disclosed. In one embodiment, the users are not part of the closed group, and the method includes broadcasting or multicasting the information to the user which are not part of the closed group, as well as users that are part of the closed group. The information includes information relating to which of the services may be available via the network resource to the users which are not part of the closed group.

In one variant, the method further includes delivering at least one of the services that are available via the network resource to at least one of the users which are not part of the closed group.

In another variant, the act of delivering includes delivering without establishing a new connection to support the delivery, and the network resource includes a femtocell in communication with a parent cellular network. Delivery without establishing a new connection includes for example delivering without establishing an RRC (Radio Resource Control) layer connection.

In a further variant, the broadcasting or multicasting of the information relating to which of the services may be available via the network resource to the users which are not part of the closed group includes broadcasting or multicasting a listing of available services using at least an extant system information (SI) message.

Alternatively, the multicasting of the information relating to which of the services may be available via the network resource to the users which are not part of the closed group includes multicasting information indicating whether the network resource is partially open to the users which are not part of the closed group; a listing of service types offered for the users which are not part of the closed group; or information about one or more schedules regarding the partial open access for the users which are not part of the closed group.

In a fifth aspect of the invention, a method of operating a closed group asset of a wireless network so as to provide one or more services to users which are not part of the closed group. In one embodiment, the operation of the asset has minimal impact on the resources of the wireless network, and the method includes: identifying one of the one or more services to be provided to a user terminal which is not associated with a member of the closed group; and delivering the identified one or more services to the user without establishing a dedicated connection to the user to support the delivery.

In one variant, the asset includes a femtocell in communication with a parent LTE-enabled cellular network, and delivery without establishing a dedicated connection includes delivery without establishing an RRC (Radio Resource Control) layer connection. The delivery of services includes e.g., providing access via the femtocell to an existing Multimedia Broadcast Multicast Service (MBMS) broadcast to at least the user.

In a sixth aspect of the invention, a method of providing at least partial public access to a private access network operating within a public network is disclosed. In one embodiment, the method includes: providing one or more services, wherein the services are categorized into access groups, the access groups comprising: (i) a private access group, and (ii) a group that provides at least partial public access; broadcasting information that identifies one or more services and its corresponding access group; identifying one or more of the provided services from a terminal; classifying the terminal as either a member terminal or a non-member terminal; and selectively serving the identified one or more services corresponding to the terminal classification.

In one variant, the non-member terminals are served only those services belonging to the group that provides at least partial public access. The serving of services to the non-member terminals is performed without a dedicated connection, thereby consuming no significant additional resources of the public network.

In another variant, the groups include (i) a private access group, (ii) a partial public access group, and (iii) a public access group; and the non-member terminals are served only those services belonging to the partial public access group and/or the public access group.

In a seventh aspect of the invention, a method of optimizing resource allocation within a public cellular network is disclosed. In one embodiment, quality of service (QoS) is optimized within a private cellular network having a femtocell and a private group approved for access to the femtocell, and the method includes selectively providing at least partial access to the femtocell to users who are not part of the private group but which are proximate to the femtocell. Such selective provision includes using an existing connection resource used by the femtocell to access the public network. The selective provision of at least partial access improves at least one aspect of service quality for the users over that if the at least partial access was not provided. Also, using an existing connection resource optimizes resource allocation by obviating a requirement for a dedicated connection to support the selective provision.

For instance, the at least one aspect of service quality may include cellular device battery duration, or wireless link quality.

In an eighth aspect of the invention, a closed-group femtocell configured to interoperate with a wireless network so as to provide one or more services to users which are not part of the closed group is disclosed The apparatus includes: at least one wireless transceiver, with the at least one wireless transceiver being configured to communicate with at least one of the users to: (i) transmit to the at least one user information relating to services which may be available to the at least one user via the femtocell; and (ii) identify one of the one or more services to be provided to a user terminal which is not associated with a member of the closed group. A processor is in data communication with the at least one transceiver; and a storage device is in data communication with the processor, the storage device comprising at least one computer program which, when executed on the processor: determines a classification of the one identified service, the classification being part of a multi-class classification scheme; and serves or does not serve the one identified services to the requesting user based at least in part on the determined classification.

In a ninth aspect of the invention, a cellular apparatus capable of operating within a private access network that is in communication with a public cellular network, the private access network offering at least partial public access and private access network operation. In one variant, the apparatus includes a mobile terminal or UE (e.g., cellular telephone or "smartphone").

In a tenth aspect of the invention, a computer-readable apparatus comprising a storage medium is disclosed. In one embodiment, the storage medium stores one or more computer programs which, when executed on a host device, implement the various methods and functions described herein.

Other features and advantages of the present invention will immediately be recognized by persons of ordinary skill in the art with reference to the attached drawings and detailed description of exemplary embodiments as given below.

BRIEF DESCRIPTION OF THE DRAWINGS

FIG. 8A illustrates one exemplary message format (i.e., System Information Block (SIB) Type 1) useful in implementing the present invention.

DETAILED DESCRIPTION OF THE INVENTION

Figure 1:
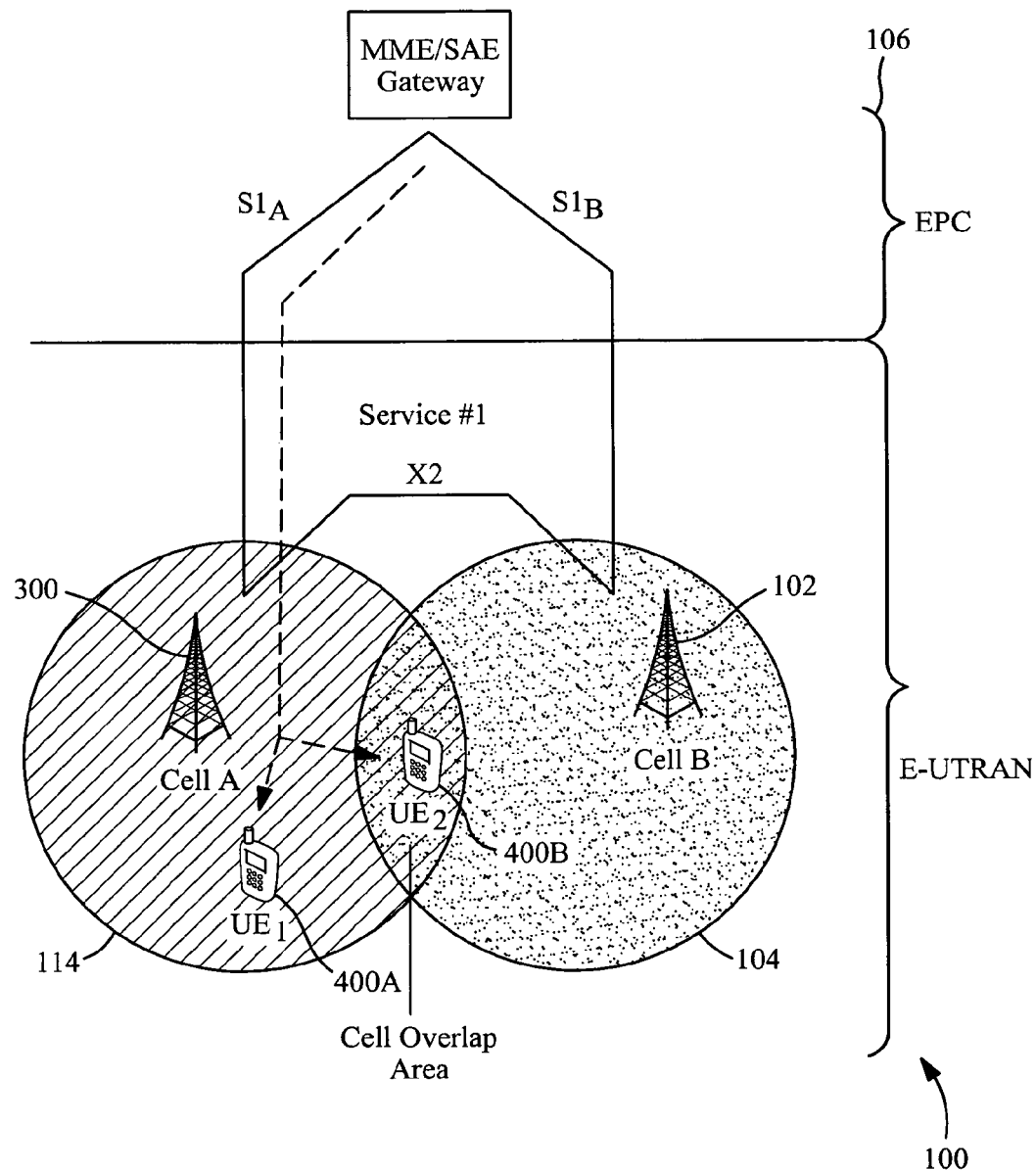
FIG. 1 is a graphical illustration of a typical wireless system having at least one fixed base station (macrocell) and at least one femtocell, in which the methods and apparatus of the present invention may be employed.

Reference is now made to the drawings, wherein like numerals refer to like parts throughout.

Overview

The present invention discloses, inter alia, methods and apparatus that facilitate a wider range of wireless femtocell access options than those presently available. These access options in one embodiment include various grades or levels of private and public access to available femtocell services. Specifically, methods and apparatus are disclosed for use with wireless (e.g., cellular) femtocells that integrate with existing cellular networks in order to enable one or more service access types including: (i) private access, (ii) public access, and (iii) one or more levels of partial public access. Furthermore, each service may be separately assessed and assigned a various access type, such that a femtocell may service multiple users with multiple varying access levels. In one embodiment, a femtocell broadcasts enhanced system information to all terminals (irrespective of member/non-member status) such that a non-CSG (Closed Subscriber Group) member UE is capable of receiving partial service access within a CSG cell. In the context of an LTE network, modifications to the extant System Information (SI) protocol advantageously enable a plurality of different access options. For CSG Cells, the modifications can include an indication that the CSG Cell is partially open for limited or non-member UEs. Such an indication may additionally comprise a listing as to which service types are offered for such limited or non-member UEs via the CSG Cell. Other variants include a complete enumeration of the services which are offered for member, limited member, and non-member UEs via the CSG Cell, and resources for which the services are being offered.

Such detailed information may also encapsulate additional parameters necessary for "RRC-connection-less" reception, and may include restrictions (e.g., validity) regarding the partial open access for non-member UEs. Such validity limitations may include maximum service time limits (e.g. preview period), service expiration information (e.g. valid until time), etc.

In another salient aspect of the invention, a femtocell servicing "partial" public access may allocate at least a subset of its capability so as to offer service to all terminals regardless of their membership status. Such provisioning may require minor changes to signaling and control protocols; these changes are identified to the user terminal if necessary. As described herein, connection-less services which are partially open for access are provisioned for all terminals regardless of membership. In one embodiment, a HNB providing Multimedia Broadcast Multicast Service (MBMS) to a first member UE, changes the MBMS access type to partial public access. The new access classification of the MBMS service published via the HNB's System Information Broadcast (SIB), provides the MBMS broadcast to all UEs in that cell. Other UEs may consume this service offering in the coverage of the HNB without establishing a RRC connection (to the HNB). Furthermore, the other UEs may maintain their current RRC state in their respective serving macrocells.

In one embodiment, a user terminal capable of receiving partial public access allocates at least a subset of its resources to consume such services when desired. For example, a non-member UE decodes detailed system information identifying media content of a nearby CSG Cell, which is being transmitted as open for "partial public access". The non-member UE then opts to "tune in" to a previously provided Multimedia Broadcast Multicast Service (MBMS) already being broadcast to member UE(s) without requiring a separate RRC connection.

Furthermore, if an additional RRC connection is required, the non-member UE may opt to establish a separate RRC connection to an allowed cell. Thus, the non-member UE supports a RRC connection from an allowed cell, while simultaneously receiving a media stream from a CSG cell.

Alternatively, a femtocell servicing partially public access and allowing limited connection capabilities may allocate at least a subset of its capability so as to offer service to all terminals regardless of their membership status. An HNB may for example provide automated delivery of multimedia-enabled advertisements (such as an automated advertisements, or video broadcast) to any requesting UE.

Various embodiments of the disclosed invention also allow for control over access levels and assignment of communication linkages by either or both of the femtocell operator and the network operator. Such "shared" access control may be static or dynamic. The femtocell operator may choose to assign various access levels to various services for commercial exploitation, such as where users within a closed group are allowed access to specific upgraded services, whereas users within the partial public group may be allotted simple services, or even a uniform simple "advertisement" type broadcast. The network operator may choose to assign various access levels to various forms of service for network optimization reasons.

The improved solutions disclosed herein advantageously allow more access "granularity" (i.e., ability to tailor access options or levels on a per-HNB basis) than private and public access. Ideally, access levels can be based on or tailored to a variety of criteria for each service type. Providing the femtocell operator with the capability to service non-CSG members using ostensibly closed femtocell resources, improves the perceived coverage and corresponding value of a cellular phone, as well as provide additional incentive for the femtocell operator to invest in or deploy femtocells.

Various embodiments of the invention also allow the network operator to control access of media for classes of users, transparent to the femtocell operator, so as to optimize overall network efficiency. Such "dual" managed access control, wherein control is shared by both the femtocell operator and the network operator, significantly increases the desirability of widespread femtocell deployment for the network operator.

Detailed Description of Exemplary Embodiments

Referring now to FIGS. 1 through 9B, exemplary embodiments of the apparatus and methods of the present invention are described in detail.

In the embodiments described herein, a cellular network supporting femtocells is considered. However, it will be recognized that the methods and apparatus of the invention can be easily adapted to any Radio Access Technologies (RATs), including for example and without limitation, an LTE system (E-UTRAN) supporting HeNBs (see detailed discussion provided herein with respect to FIGS. 5A-9B), and any combination of predecessors such as UMTS (UTRAN) and GSM (GERAN).

Moreover, while discussed primarily in the context of broadcast/multicast based services (e.g., Multimedia Broadcast Multicast Services (MBMS)), it will be recognized that other data services may be offered without departing from the principles of the invention described herein. For example, Cell Broadcast Service (CBS) is another example of a RRC-connection-less service. CBS is a Short Message Service (SMS) broadcast to all UEs in a cell.

Additionally, while the concepts discussed herein are shown primarily with respect to femtocells, it is anticipated that similar measures may be performed for "standard" (e.g., fixed macrocell) base stations, in that such base stations can also operate as Closed Subscriber Group Cells in certain situations.

Complementary Technologies—

Various technologies useful in implementing the exemplary embodiments of the present invention are now described in greater detail, including MBMS, Femtocells, Radio Resource Control (RRC), and Closed Subscriber Groups.

MBMS—

As used herein, the term "MBMS" refers without limitation to methods, apparatus and services compliant with one or more of the following, each incorporated herein by reference in its entirety: 3GPP TS 22.146 entitled "Multimedia Broadcast/Multicast Service (MBMS); Stage 1 (Release 8)"; 3GPP TS 23.246 entitled "Multimedia Broadcast/Multicast Service (MBMS); Architecture and functional description (Release 8)"; 3GPP TS 25.346 entitled "Introduction of the Multimedia Broadcast/Multicast Service (MBMS) in the Radio Access Network (RAN); Stage 2 (Release 8)"; 3GPP TS 25.992 entitled "Multimedia Broadcast Multicast Service (MBMS); UTRAN/GERAN Requirements" V 7.0.0; 3GPP TS 43.246 entitled "Multimedia Broadcast/Multicast Service (MBMS) in the GERAN; Stage 2" (Release 8); 3GPP TR 25.803 entitled "S-CCPCH performance for Multimedia Broadcast/Multicast Service (MBMS) (Release 6)"; 3GPP TS 22.246 entitled "Multimedia Broadcast/Multicast Service (MBMS) user services; Stage 1 (Release 8)"; 3GPP TS 26.346 entitled "Multimedia Broadcast/Multicast Service (MBMS) (Release 8); Protocols and codecs"; 3GPP TR 26.946 entitled "Multimedia Broadcast/Multicast Service (MBMS) user service guidelines (Release 8)"; 3GPP TS 33.246 entitled "3G Security; Security of Multimedia Broadcast/Multicast Service (MBMS) (Release 8)"; and 3GPP TS 32.273 entitled "Telecommunication management; Charging management; Multimedia Broadcast and Multicast Service (MBMS) charging (Release 8)."

MBMS utilizes the so-called "Fountain code" based forward error correction codes designed specifically for erasure type radio channels. Fountain codes are unique from other Forward Error Correction schemes (e.g., turbo codes, Viterbi, Reed-Solomon, etc.), in that they do not require any specific packet order, nor specify any fixed decoding length. Instead, each received packet cumulatively adds to the decoder's probability of successful decoding. Thus, a receiver receives only as many packets as it requires to decode the message (akin to drinking from a fountain, where each drop fills a cup). MBMS leverages Fountain code capabilities, to enable multiple receivers of the same media. Even though each receiver receives different packets, they may each consume the same broadcasted media stream without undue additional network burden. MBMS specific Radio Resource Control (RRC) connections may be used to initialize Fountain code based receivers; however no RRC connection is required for MBMS reception. Thus, a MBMS media stream can be received by any number of recipients.

MBMS is proposed for existing GSM and UMTS cellular networks. MBMS is scheduled to be introduced in some cellular networks during 2008 or 2009, giving the opportunity to broadcast TV, film, information and other media in those networks. MBMS allows the network operator to reuse existing network infrastructure. The "recycling" or reuse of current network resources is much more cost effective than purchasing new network infrastructure for comparable services. Additionally, broadcast-type techniques can service a near unlimited number of users with constant network load (e.g., similar to television broadcasts). Currently plans exist to introduce MBMS also into the 3GPP LTE family of standards for releases higher than 3GPP Rel-8.

Femtocells—

Femtocells are far cheaper to manufacture than a standard base station, and possess simpler software. Femtocells may not be fully featured as compared to their macrocell counterparts, and generally cannot support the same number of users as a typical macrocell base station. However, femtocells are designed for self-contained deployment. The relative cost and simplicity of operation allows a nontechnical audience (i.e., residential, enterprise, or other such users) to purchase and operate femtocells. The benefits of femtocell deployment are shared between the user and the network. For a user, as mentioned above, the femtocell offers an inexpensive and easy method to improve network coverage.

Another distinct advantage of femtocells over other user managed ad hoc networks is their seamless integration with current network (macrocell) base stations, as opposed to the expensive hardware and software costs necessary for multimode capable transceivers. Lastly, the low manufacturing and deployment cost of femtocells allows femtocells to lead "fixed" network base stations in cutting edge technology introduction, since inter alia (i) their design cycles are shorter, and (ii) they do not require significant or network-wide infrastructure upgrades which can dramatically increase latency. Ideally, femtocells may allow a home, business, or other user the ability to fully utilize their cellular equipment to its maximum capability, even when neighboring "fixed" network base stations cannot support such features.

In many regards, femtocell access control is virtually identical to pre-existing base station access control methods. Femtocell use cases however, are significantly more flexible and wider ranging.

Radio Resource Control—

Radio Resource Control (RRC) is handled between two complimentary logical entities (located within a UE, and a macrocell or femtocell). The RRC state machine has two states: RRC_CONNECTED, and RRC_IDLE. During RRC_CONNECTED the UE has a RRC connection with the cell. During RRC_IDLE, the complimentary entities are not connected. Generally only one RRC connection can exist at any time between the UE and the macrocell or femtocell entities (i.e., the RRC layer "peers" do not maintain multiple RRC connections).

While the UE is in RRC_IDLE, the base station does not communicate directly with the UE. The UE may still actively receive information from the base station while in RRC_IDLE. For example, the UE may periodically monitor system information, or other broadcast downlink channels (such as paging channels, broadcast control channels, etc.). Some transport technologies, such as MBMS, do not require RRC connections for data delivery.

In order to communicate with a base station, the UE must establish an RRC connection to the base station. Once a RRC connection is established, the UE and base station can engage in a two-way dialog. Thus, in the RRC_CONNECTED state, a UE may request services, perform location area updates or send data. The existence of the RRC connection is independent of the data being transferred, e.g. telephony and data services do not have different RRC connections.

As noted above, certain services can be received in either RRC_IDLE, or RRC_CONNECTED states. For example, a RRC connection is not required for MBMS reception, because the MBMS service may be broadcast in the cell without any feedback from recipient UEs. In fact, a RRC connection is only required for reception of MBMS if another service requiring a RRC connection is used in parallel; e.g., a voice call or regular location area updates. In another such example, a RRC connection is not required for Cell Broadcast Service (CBS) reception. CBS is a one-to-many Short Message Service (SMS) supported within GSM, and UMTS. CBS may be used for nationwide or citywide alerting, weather reports, mass messaging, location based news, etc.

Closed Subscriber Groups (CSG)—

A CSG Cell provides its CSG Identity to requesting UEs. A CSG-enabled UE maintains a CSG "white list"; the CSG white list may also be stored in an associated smart card or other such mechanism. This white list identifies the cells which are accessible to the UE. The structure of a cell's CSG Identity may comprise several parts, including but not limited to: (i) a Public Land Mobile Network Identification (PLNM-ID) which is usually a five digit number (e.g. "26201" for T-Mobile™ Germany); and/or (ii) a Tracking Area Code (TAC). Additional or alternate components of the CSG Identity may also be utilized subject to, inter alia, finalization of 3GPP standards for CSG operation.

A CSG Cell may provide its CSG Identity—via the mobile communication network's previously defined system information broadcast capability—so as to enable appropriate UEs to access the Cell. The "closed" access allows the delivery of certain multimedia content services (to be described subsequently herein) to a number of recipients via the CSG Cell in a controlled manner. Customers will often prefer to consume "rich" content such as the aforementioned multimedia content when they are being served at their HNB, rather than when they are using more expensive traditional cellular network resources. The broadcast of high bandwidth applications using HNBs is advantageous for the Mobile Network Operator (MNO), because use of the HNB reduces the load on network resources for its localized service domain. The "home" user also benefits from the greatly improved quality of the radio link between their UE and their HNB. CSG Cell operation ensures that the owner/lessee of the HNB (and other members within his closed group) will fairly receive the appropriate advantages of private femtocell operation.

Exemplary Problem Scenario—

In one exemplary traditional network, a HNB has a private broadband connection (e.g., A DSL line, cable modem, etc.) into the Mobile Network Operator's (MNO) Core Network (EPC). A typical base station is connected via cellular infrastructure to the EPC. The base station and infrastructure operate within the MNO's domain; however the HNB is only indirectly controlled by the network operator. A first UE has the Cell ID of the HNB stored in its "white" list, and is allowed to use the HNB freely. A second UE does not have the Cell ID of the HNB stored in its white list, and is not allowed access to any services. In one example scenario, the second UE may request a MBMS multimedia stream from the base station, which is a duplicate of the multimedia service which the HNB is already providing to the first UE. The second UE is in an overlap area where it may have good network coverage from both the base station and the HNB.

The second UE would be a good candidate for receiving the multimedia service from the HNB, rather than the base station. Furthermore, it is appreciated that the HNB could service the second UE's request without requiring the establishment of a new RRC connection (i.e. between the second UE and the HNB). Unfortunately, the second UE is not allowed to use any HNB which is not stored within its internal white list. Thus, the second UE of the present example is blocked from efficient service provisioning (e.g. duplication of existing MBMS service broadcast to the first UE).

Additionally, the foregoing scenario presents a secondary complication. The UE may only maintain a single RRC connection at any time. The UE is free to make or break RRC connections to its serving base station. Unfortunately, the UE cannot make an additional RRC connection to the HNB while simultaneously maintaining an existing RRC connection with the base station. Consequently, an invention enabled UE must also simultaneously enable reception of MBMS services from a second femtocell (or basestation), while maintaining a RRC connection with a basestation.

Lastly, the initialization of MBMS services is typically done by a UE via an existing RRC connection. Generally, the UE connects to the MBMS service provider, and requests the service via the current cell or base station. Two (2) distinct methods of MBMS service initialization are described herein: i) a first CSG UE requests the MBMS service within the CSG cell, the non-CSG UE piggybacks on the CSG UE's request, or ii) the non-CSG UE requests a MBMS service from its connected base station, and the service is provided via a CSG cell.

System Architecture—

Referring now to FIG. 1, one exemplary high-level system architecture 100 useful in implementing the principles of the present invention and solving the aforementioned problem scenario is shown and described in detail. The architecture of FIG. 1 comprises in one embodiment of a femtocell (Cell A) 300 having wireless coverage area 114 configured as a CSG Cell. Cell A 300 has a $S1_A$ interface (e.g. a DSL line or other such interface) into the Core Network 106 (EPC) of the Mobile Network Operator (MNO). Cell B 102, having a wireless coverage area 104, is a typical base station (e.g., fixed macrocell) that is connected via $S1_B$ to the EPC. Cell B and $S1_B$ are within the MNO's domain. Cell A 300 and $S1_A$ are indirectly controlled by the network operator, but they are privately owned and operated.

A first $UE_1$ 400A of FIG. 1 has the Cell ID of Cell A 300 stored in its white list; i.e. the first $UE_1$ 400A s allowed to use Cell A for all communication services offered. A second $UE_2$ 400B does not have the Cell ID of Cell A stored in its white list, therefore the second $UE_2$ 400B is prohibited from accessing Cell A via well known mechanisms. The second $UE_2$ 400B has requested Service #1 in Cell B, which is a duplicate of the service which Cell A is providing to the first $UE_1$ 400A. The methods and apparatus of the present invention enable the second $UE_2$ 400B to access Cell A 300.

In the illustrated embodiment of FIG. 1, Service #1 is used without any restrictions. Generally speaking, Service #1 may be either a real-time service or a non-real-time service. Services may also be of the unidirectional or bidirectional type. Such services may be used to convey voice/audio, video still images or video clips/broadcast content, presentations, data files, etc. in sequence or in parallel. For example, MBMS is ideally suited for cells occupied with multiple interested users. The MBMS registration procedure may require a RRC connection for initialization. Furthermore, in some MBMS use cases, the actual multimedia-data carried via MBMS may be encrypted (e.g. pay-per-view television, etc.). Accordingly, a RRC connection may be required to transfer information (e.g., encryption keys, synchronization symbols, etc.). In such cases, service delivery requires a RRC connection, even though the MBMS transmission itself is connection-less.

Typical forward error correction (FEC) schemes (e.g., turbo codes, Viterbi, Reed-Solomon, etc.) perform "static" or fixed rate encoding. For example, a ⅓ rate Turbo Code generates three transmission bits (e.g. one systematic bit, two parity bits) for each one input bit. The receiver decodes a code block having this "fixed" redundancy and, based on the output of the decoder, determines if the code block was successfully reconstructed. Such schemes are commonly used in conjunction with a reverse link channel for acknowledgements. If the receiver fails to decode the transmitted code block, a retransmission is requested via the reverse link.

Conversely, the exemplary MBMS service of one embodiment of the present invention utilizes a so-called "fountain code" based forward error correction, which can provide a near infinite number (I) of different message packets for any code block. A relatively small number (N) of these arbitrary message packets can be processed to reconstruct the original code block. However, a much larger number (M) of message packets are actually transmitted from the transmitter to the population of receivers. Each receiver receives a number (K) of these arbitrary messages, which is slightly larger than N, and much smaller than M (i.e. the receiver decodes K messages, where K satisfies the properties N<K<M<<I). Each receiver does not necessarily receive the same K packets. Accordingly, even though each receiver receives different packets, and the population of receivers may be arbitrarily large, the network burden is actually fixed (e.g., only M packets are transmitted). Fountain codes in this sense are "rate-less"; there is no defined rate between the receiver and the transmitter.

In greater detail, fountain code enabled transmitters determine a characteristic matrix for each code block. The transmitter then uses a pseudo-random key generator to generate sequential input vectors, which are multiplied against the characteristic matrix to produce a plurality M of message packets. These message packets are broadcast to the population of receivers. Each receiver which has a synchronized pseudo-random key generator can determine the characteristic matrix from any N of the M message packets using basic linear algebra (K message packets are collected to compensate for corrupted symbols). Once a receiver has determined the characteristic matrix, it derives the original code block.

The relatively low amount of information needed by a fountain code-enabled receiver makes MBMS ideal for "Idle Mode Reception" (i.e. reception during RRC_IDLE state). Any MBMS receiver which has a synchronized pseudo-random key generator can receive the broadcasted MBMS media stream, and enjoy its content. Thus, various gradations of MBMS key distribution may be enabled by the present invention. In one exemplary case, a RRC connection is only briefly established to synchronize the receiver to the transmitter. In another exemplary case, MBMS key distribution is performed on a common access channel (e.g., a pilot channel) thus enabling RRC-connection-less MBMS operation. In yet another embodiment, a transmitter may support one RRC connection for a "master" receiver, while simultaneously broadcasting the key to other "piggybacked" users; thus allowing the one master user to control the MBMS broadcast, while other users passively tune in.

While the unique properties of fountain codes are especially well suited for this invention, it is appreciated that neither fountain codes nor their intrinsic properties are required to practice the invention. Indeed, any technology which is capable of simultaneously transmitting to any plurality of users could likewise benefit from the designation of multiple broadcast classes. Hence, the invention may also find use with inter alia, "static" decoder technologies. In one such example, a fixed receiver which has requested a standard service from the network may be redirected to a CSG femtocell having additional capacity. Such redirection may override the receiver's internal white list, thus enabling "dual" managed access control.

In another such example, a fixed receiver which is piggybacking on an established session may simply accept the downlink stream "as is". Some error correction schemes that rely on complex receiver transmitter dialogs may require the piggybacking receiver to discard data, and or accept less robust transmissions. For example, Automatic Repetition Request (ARQ) relies on acknowledgments and retransmissions to correct data transmission. ARQ technologies generally fall within two categories i) incremental redundancy, and ii) chase combining. Incremental redundancy transmits data frames containing different (new) information than previous frames. Chase combining retransmits data frames containing the same information as previous frames. While a piggybacking receiver may not have the ability to acknowledge successful receipt of a data frame, it can listen in on successive retransmissions when it has received corrupted data. Alternately, the transmitter may always transmit a fixed number of transmissions and or retransmissions, and the population of receivers discards the frames which are extraneous.

FIGS. 5A-9B described subsequently herein illustrates various implementation-specific aspects of the present invention in the context of an exemplary LTE network infrastructure.

Methods—

Figure 2A:
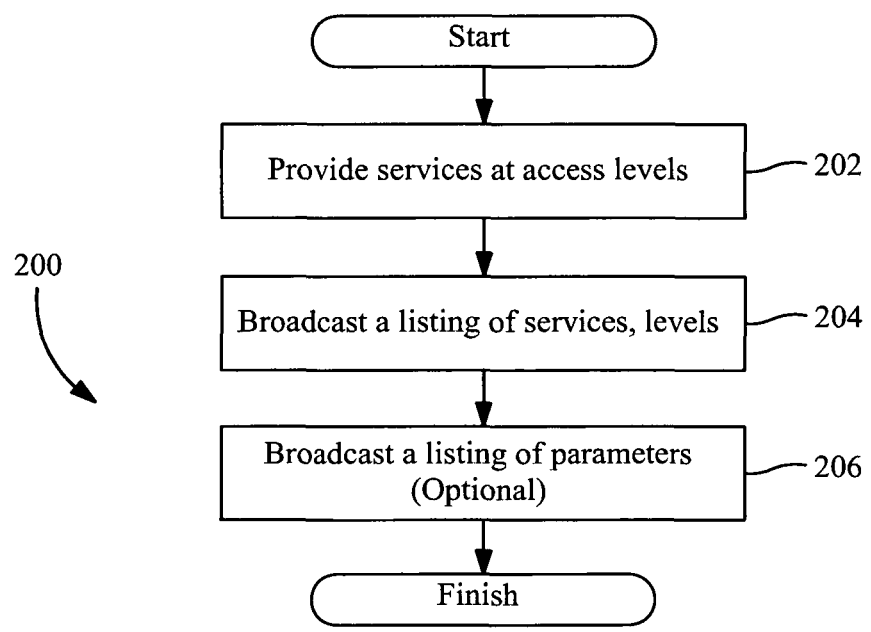
FIG. 2A is a logical flow diagram illustrating one embodiment of the generalized method of providing services having various access levels according to the present invention.

Referring now to FIG. 2A, one embodiment of the generalized process 200 for providing services having various access levels is illustrated and described in detail.

Initially, a femtocell (such as that of FIG. 1 above) is directed to provide one or more services. Such direction may originate from a serviced user (e.g., from their UE) or their proxy, a nearby base station (via inter-base station communication), the core network, or even the femtocell itself. Such services are (in this illustrated case) of the broadcast or multicast type, although this is not a requirement. Furthermore, each service is additionally assigned one or more associated "access levels". Assignment of the access level(s) may be made by the requestor of the service, the originator or supplier of the service, or the serving femtocell. As described in greater detail below, this assignment may be static in nature (such as where prescribed services are given static or substantially unchanging access levels), or dynamic (e.g., such as where the particular user or use context of the service request is used as a basis of assigning access level).

At step 202, a femtocell provides the one or more services, and indicates the access level(s) associated with each provided service. In one embodiment, the varying access levels minimally comprise: (i) a private access level, and (ii) a partially public access level. In one variant, the access levels additionally comprise (iii) a (fully) public access level. As used herein, the term "partial public access" refers without limitation to services which are initiated or maintained by, or associated with, one or more members of a closed group, but which can be made available to a larger audience (e.g., the entire subscriber pool or even the public in general). Moreover, various gradations of partial public access may service a select plurality of subscribers (e.g. multicast), or even all network subscribers (e.g. broadcast).

As used herein the term "private access" refers without limitation to services which are limited to one or a group of subscribers.

As used herein, the term "public access" refers without limitation to services which are not limited to any particular group of subscribers. Note, however, that in certain embodiments, the services may be limited to certain sub-populations of the general public (e.g., limited to only subscribers of a given network operator, etc.).

In an alternate embodiment, one or more partial public access levels are indicated with a Boolean value for each of the one or more services (see discussion of FIGS. 8A and 8B subsequently herein for exemplary access level coding).

In one embodiment, access levels are assigned to particular services at inception, and remain static throughout the service. In an alternate embodiment, access levels are dynamically updated to the services by the originator of the service (e.g. femtocell, network operator, etc.) based on one or more criteria, such as where a user's subscription status changes, operation restrictions on services are imposed, etc. These dynamic updates may be periodic, anecdotal (e.g., based on a particular event or criterion being met), or even continuous in nature.

At step 204, the femtocell broadcasts or otherwise transmits an indication that the femtocell is at least partially "open" for mobile access, on a publicly accessible resource. In one embodiment, the publicly accessible resource is predetermined, although it may also vary with time and/or other network operating conditions.

In one exemplary variant, the publicly accessible resource encapsulates a system message during designated periodic time slots (e.g. a MIB type or SIB type 1 message described in greater detail subsequently herein with respect to FIGS. 5A-9B). The system message additionally comprises an unencoded listing, indicating the presence of at least a subset of the plurality of services, and at least one accompanying access level. Additionally, such information may also include a service type, a service detail, and/or any validity modifiers or qualifiers (e.g., time limits, preconditions, service limits, etc.).

In one alternative variant, at step 206, the broadcast indication of step 204 optionally references a second aperiodic system message, the latter which is only transmitted during the provision of specific services (e.g., partial public access, public access, etc.). The second message encapsulates detailed information necessary to demodulate or utilize the specific service. In one exemplary embodiment, the first message is a periodically occurring message during a specified time slot (e.g. a MIB type, or SIB type 1 message), and the second aperiodic message (e.g. a SIB type X message described in greater detail subsequently herein) additionally includes an unencoded listing comprising one or more of: (i) a service type, (ii) a service detail, and (iii) any validity modifiers (e.g., time limits, etc.). In alternate embodiments, signaling of the aperiodic message is handled with higher-level protocol or software layers (for example: Session Initiation Protocol (SIP)). In yet another embodiment, a query-response type protocol is used for requesting and transmitting the aperiodic message.

Figure 2B:
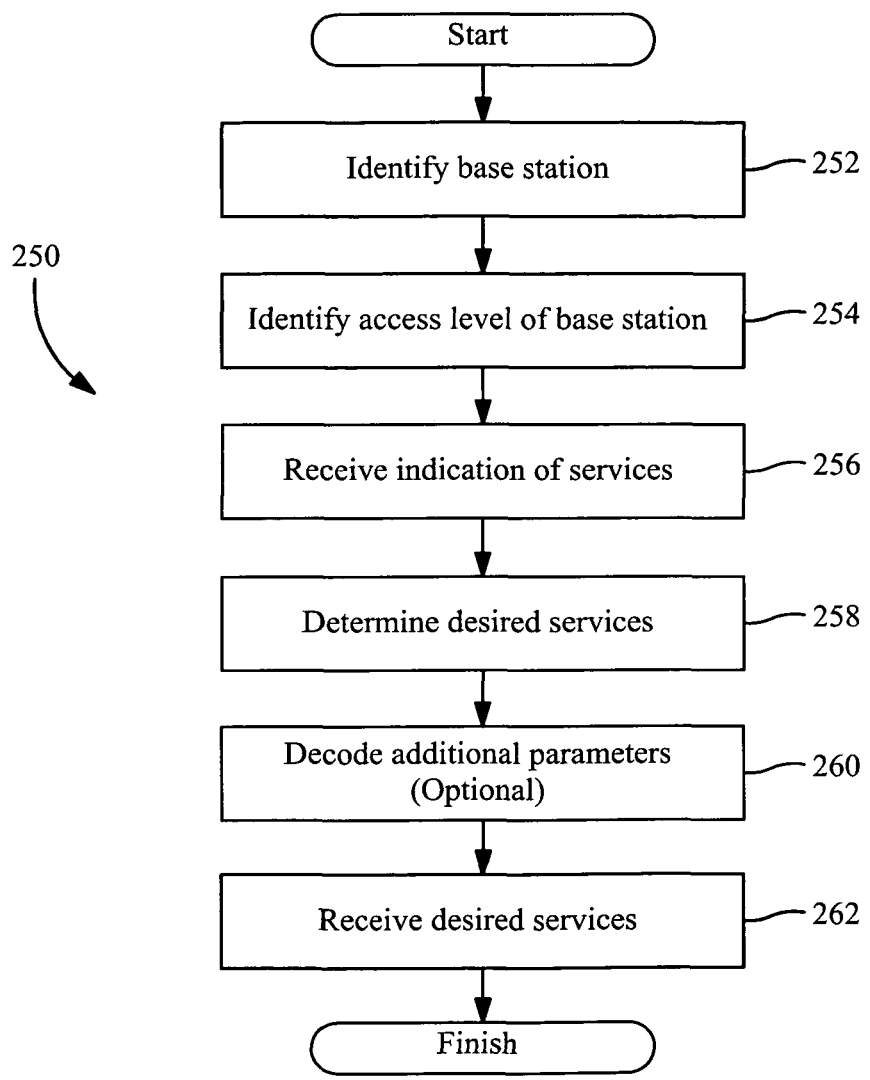
FIG. 2B is a logical flow diagram illustrating one embodiment of the method of reception of services having various access levels associated therewith according to the present invention.

Referring now to FIG. 2B, one embodiment of a process 250 for reception of services having various access levels is illustrated. This process is complementary to the process 200 of FIG. 2A.

At step 252 of the process 250, the user equipment (UE) identifies a femtocell. In one exemplary embodiment, the user equipment receives a publicly broadcast resource encapsulating a system message which uniquely identifies the femtocell from other similar network elements, as previously described. In an alternate embodiment, the user equipment may be directed to a nearby femtocell, such as where the network operator messages the user equipment through a pre-existing control or other link, having a neighboring partial public service offering.

At step 254, the user equipment determines if it can access the identified femtocell. In one embodiment, the user equipment references a localized store of listings of one or more accessible femtocells, each listing providing one or more appropriate access levels. This localized store may be indigenous to the UE itself, or on another device with which the UE communicates. In an alternate embodiment, the user equipment may receive an indication which directly or indirectly identifies one or more appropriate access levels at the identified femtocell for that UE.

At step 256, the user equipment receives an indication of at least a subset of the plurality of services offered by the femtocell. In one embodiment, this indication comprises a system message sent via a publicly accessible predefined resource which identifies the services offered by the femtocell (or relevant portions thereof).

In one variant, user equipment determines a listing of the services, and their access levels. Additionally, the user equipment may acquire such information as a service type, a service detail, and/or any validity modifiers (e.g. time limits, etc.).

In an alternate variant, a "paging" type message is utilized, where only a flag or other such mechanism indicates the existence of one or more services. The UE may opt to further decode information to receive the desired services, such as e.g., where the UE elect to decode an aperiodic message comprising detailed information regarding the services. Alternatively, the UE may query the femtocell as to the existence of one or more services allowed at its access level (i.e., a level-based search).

At step 258, the user equipment determines if any of the subset of accessible services offered by the femtocell is desired. For each service which is desired, and accessible, the user equipment performs steps 260 and 262 described below.

At step 260, the user equipment optionally receives any additional parameters necessary to access the desired services. In one embodiment, such additional parameters may include time, frequency, and/or code domain indications.

At step 262, the user equipment configures its radio receiver as required, and accesses the desired services.

In another embodiment, the UE only transmits its (temporary) identity to the Core Network (via the HNB), and does not transmit any information indicating that whether it is in or out of the CSG. Only the Core Network (after looking up the CSG for that user) informs the HNB about membership of the user in the CSG. This approach is particularly useful with respect to authentication/authorization in femtocell applications.

Femtocell Apparatus

Figure 3:
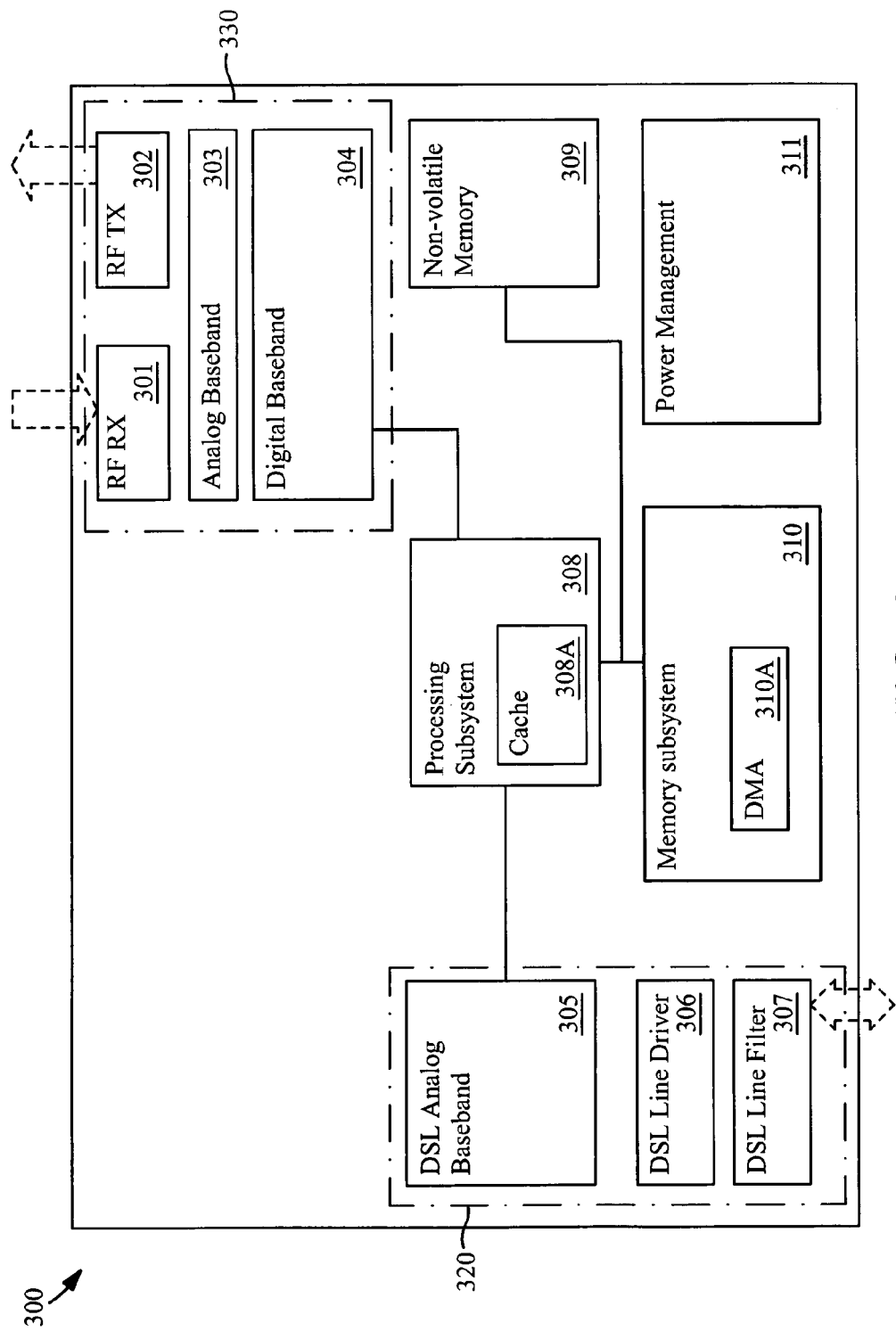
FIG. 3 is a block diagram illustrating one embodiment of a wireless network access device (e.g., cellular femtocell) according to the invention.

Referring now to FIG. 3, one embodiment of a femtocell apparatus 300 configured to implement the functionality previously described above is illustrated and described.

In the embodiment of FIG. 3, the femtocell apparatus 300 comprises one or more substrate(s) that further include a plurality of integrated circuits including a processing subsystem 308 as well as a power management subsystem 311 that provides power to the femtocell 300. The processing subsystem 308 comprises in one embodiment an internal cache memory 308A, and a plurality of processors (or a multi-core processor). As used herein, the term "processor" is meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

The processing subsystem 308 is preferably in data communication with a non-volatile memory 309, and a memory subsystem 310. As used herein the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM. The memory subsystem 310 may implement one or a more of direct memory access (DMA) 310A type hardware, so as to facilitate rapid data access. The processing subsystem 308 may also be in data communication with non-volatile memories (e.g. FLASH, HDD, etc.) 309 for code storage.

The exemplary apparatus 300 will, in some embodiments, implement some form of broadband access 320. In the illustrated embodiment, the broadband access is provided by a DSL connection and modem of the type well known in the art. Hence, a DSL analog baseband 305, DSL line driver 306 and DSL line filter 307 are shown. The digital portion of DSL processing may either be performed in the processor 308, or alternatively in a separate DSL processor (not shown). Further, while a DSL broadband connection is illustrated, it is recognized by one of ordinary skill that other broadband access schemes such as DOCSIS cable modem, T1 line, ISDN, wireless broadband (e.g., WiMAX or broadband WLAN), etc. could be readily substituted or even used in tandem with the aforementioned DSL interface.

The modem subsystem 330 comprises a digital baseband 304, analog baseband 303, and RF components for RX 301 and TX 302. While a single RX 301 TX 302 is illustrated between the exemplary femtocell apparatus 300 and a UE, it is appreciated that multiple RF front ends may exist to support multiple simultaneous UEs and air interfaces, or alternatively implement MIMO aspects of operation such as for example that described in co-owned and co-pending U.S. patent application Ser. No. 12/150,485 filed Apr. 28, 2008 entitled "Apparatus and Methods for Transmission and Reception of Data in Multi-Antenna Systems", incorporated herein by reference in its entirety.

In one exemplary implementation, the femtocell apparatus disclosed above further comprises apparatus which are capable of broadcasting one or more services to one or more subscriber units in either unicast or multicast formats. Each of the services is additionally assigned at least one access level. In one embodiment, such access levels minimally comprise "private" and "partial public". In one variant, such access levels additionally comprise (fully) "public".

Additionally, the modem subsystem 330 is further adapted to publicly broadcast on a publicly accessible resource an indication that the femtocell is at least partially open for mobile unit access. In one embodiment, the publicly accessible resource is predetermined as previously described. In an alternate embodiment, the modem subsystem may respond to queries of one or more services.

In one exemplary embodiment (illustrated in greater detail herein), an HNB configured according to the present invention and operating within an LTE network transmits a listing of its currently available partial public services encapsulated within a SIB Type 1 or MIB periodic transmission. In an alternate embodiment, the transmission listing the currently available partial public services is encapsulated within a data transmission which is not periodic. The transmission may additionally include time slot, frequency, and transport format information necessary to correctly demodulate the partial public service.

Exemplary UE Apparatus—

Figure 4:
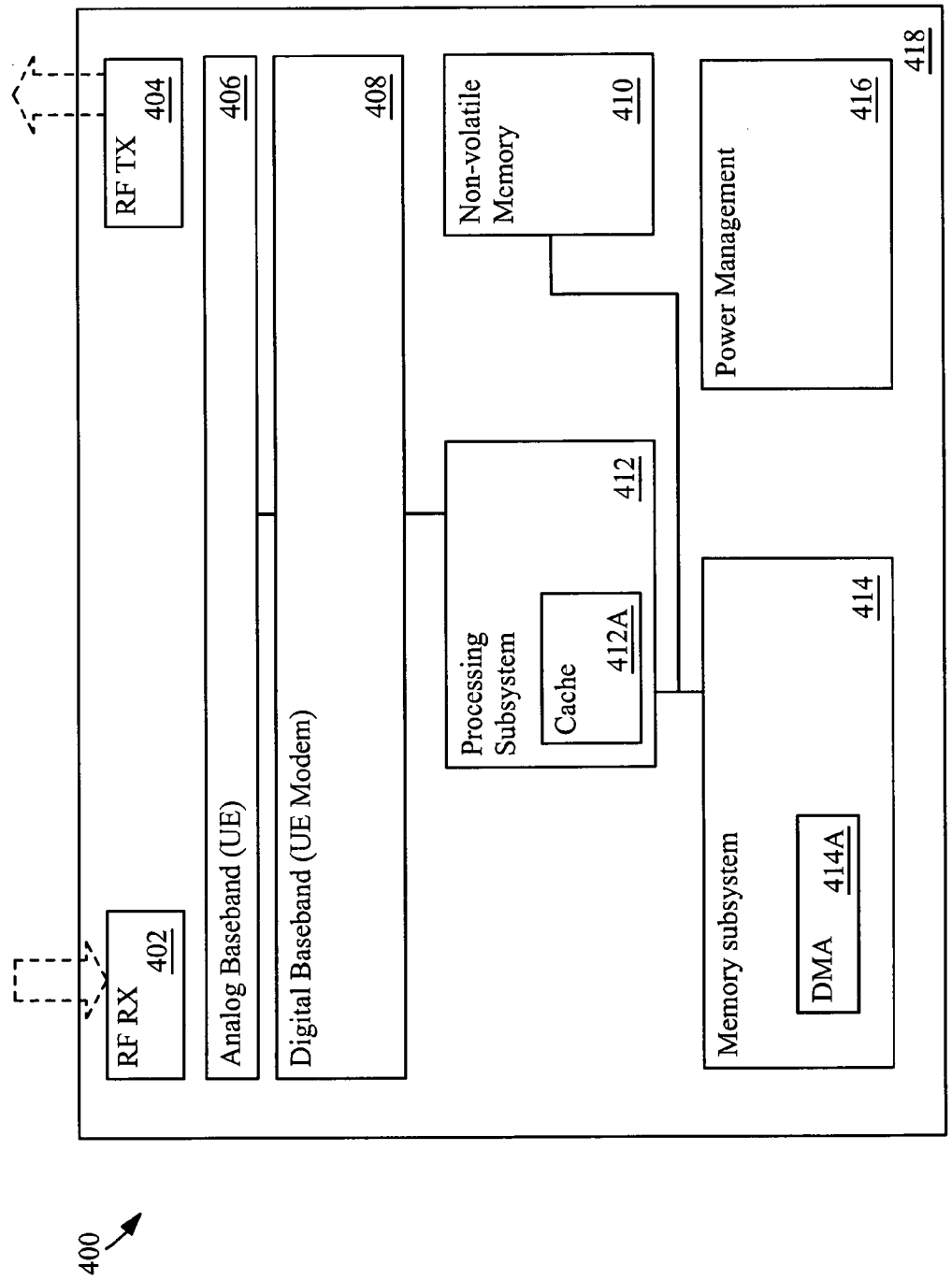
FIG. 4 is a block diagram illustrating one embodiment of a wireless user or client device (e.g., UE) according to the invention.

Referring now to FIG. 4, exemplary client or UE apparatus 400 implementing the methods of the present invention is illustrated. As used herein, the terms "client device", "end user device" and "UE" may include, but are not limited to, cellular telephones, smartphones (such as for example an iPhone™), personal computers (PCs), such as for example an iMac™, Mac Pro™, Mac Mini™ or MacBook™, and minicomputers, whether desktop, laptop, or otherwise, as well as mobile devices such as handheld computers, PDAs, video cameras, set-top boxes, personal media devices (PMDs), such as for example an iPod™, or any combinations of the foregoing.

The UE apparatus 400 comprises an application processor subsystem 412 such as a digital signal processor, microprocessor, RISC processor, or field-programmable gate array mounted on one or more substrates 418. The processing subsystem may also comprise an internal cache memory. The processing subsystem 412 is connected to a memory subsystem 414 comprising operational memory such as SDRAM, SRAM, DRAM. The memory subsystem may implement one or a more of DMA type hardware 414A, so as to facilitate data accesses as is well known in the art. The processing subsystem 412 may also communicate with non-volatile memories (e.g., FLASH, HDD, etc.) for code storage.

The radio/modem subsystem comprises a digital baseband 408, analog baseband 406, RX frontend 402 and TX frontend 404. While specific architecture is discussed, in some embodiments, some components may be obviated or may otherwise be merged with one another (such as RF RX, RF TX and ABB combined, as of the type used for 3G digital RFs) as would be appreciated by one of ordinary skill in the art given the present disclosure.

The illustrated power management subsystem (PMS) 416 provides power to the UE, and may comprise an integrated circuit and or a plurality of discrete electrical components.

In one exemplary implementation, the UE apparatus disclosed herein further comprises apparatus which is capable of receiving multiple services in either unicast or multicast formats. The radio modem subsystem comprising a digital baseband 408, analog baseband 406, RX frontend 402 and TX frontend 404, is additionally adapted to receive a listing of partial public services being broadcast by a femtocell, and if desired, intercept a partial public transmission for consumption.

In one exemplary embodiment (illustrated in greater detail herein), the UE is capable of demodulating either a SIB Type 1 or MIB periodic transmission, being transmitted from an LTE HNB. In an alternate embodiment, the transmission listing the currently available partial public services is encapsulated within a SIB transmission which is not periodic; this may complicate UE design, as the UE no longer has a predetermined notification of upcoming system updates.

Exemplary Network Implementations—

Referring now to FIGS. 5A-8B, exemplary network architectures and system protocols useful with the present invention are shown and described in detail. As previously noted, these architectures and protocols are merely for purposes of illustration of the various aspects and principles of the invention, and the invention is in no way limited to such architectures and/or protocols.

Figure 5A:
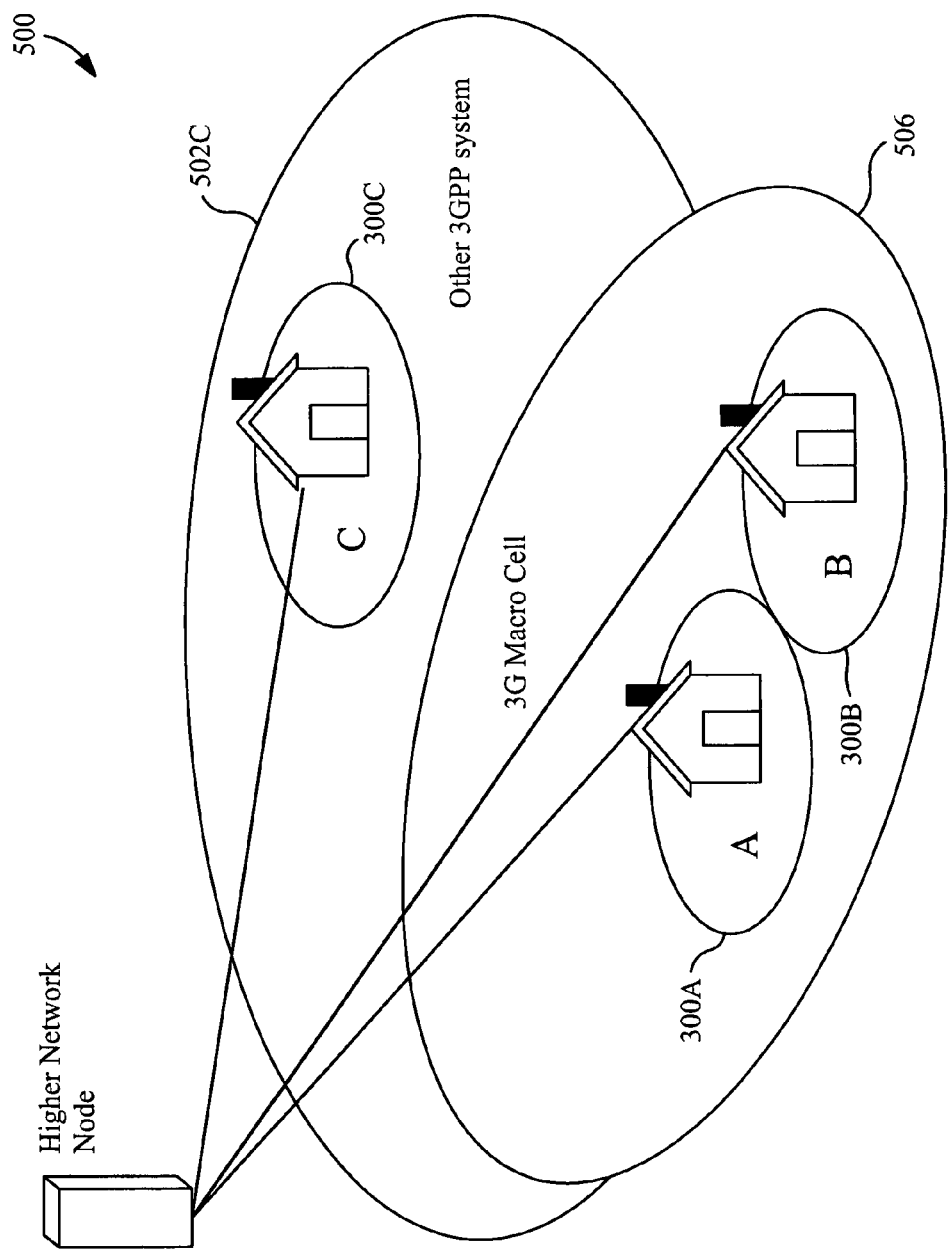
FIG. 5A is a graphical illustration of one embodiment of a deployment scenario for Home eNodeBs (HeNBs) within an LTE (Long Term Evolution) network, according to the invention.

FIG. 5A shows an example deployment scenario 500 for Home NodeBs within a UMTS network. Home NodeBs 300A and 300B are operating within a 3G-capable Macrocell 506, such as an UMTS Terrestrial Radio Access Network (UTRAN). Home NodeB 300C is operating within a legacy cellular network, such as a GSM Edge Radio Access Network (GERAN) 502.

Figure 5B:
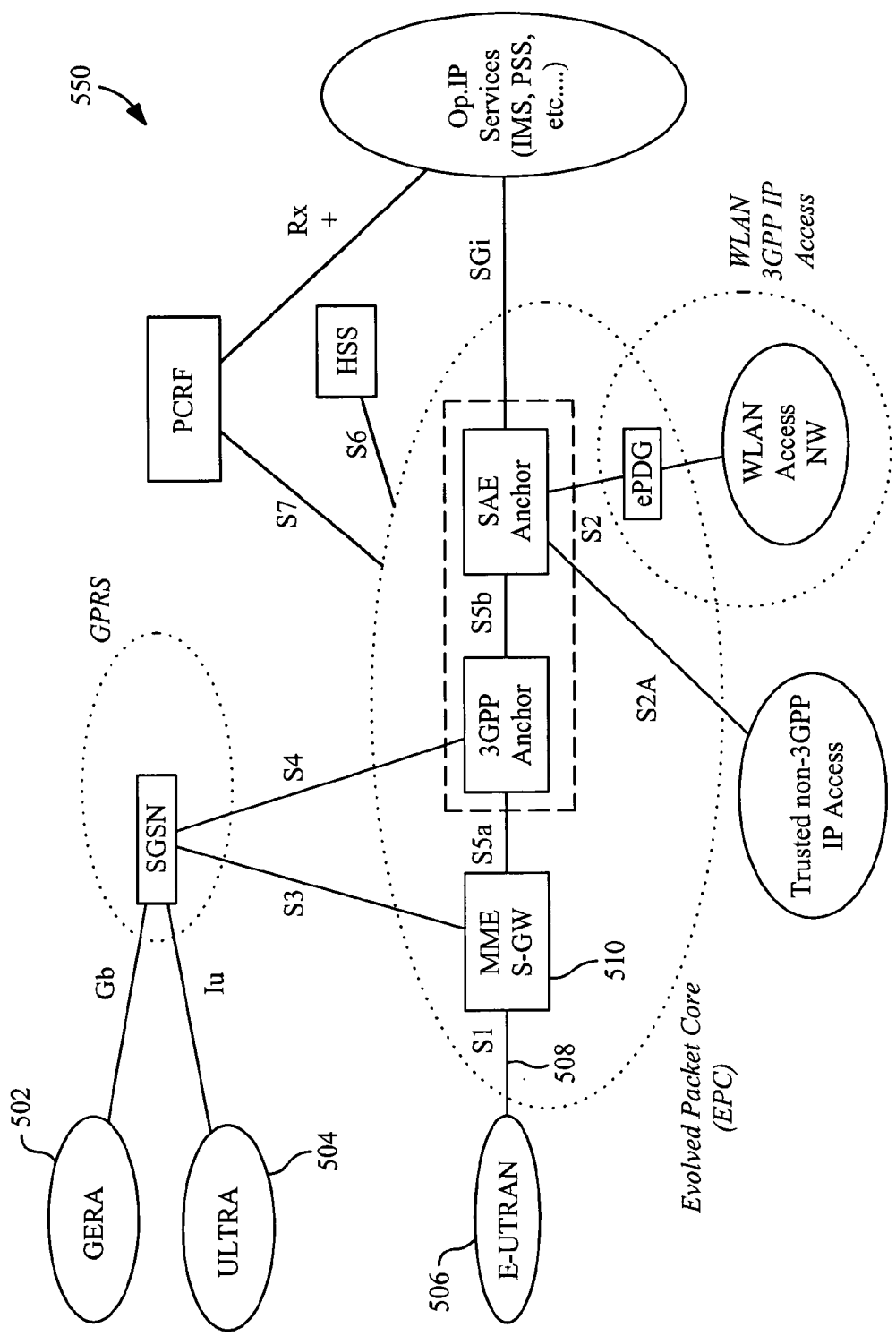
FIG. 5B is a graphical illustration of general 3GPP Network Architecture with three different Radio Access Networks (RANs) that may be used consistent with the invention.

FIG. 5B is a detailed overview of general 3GPP Network Architecture 550 with three different Radio Access Networks (RANs). The GSM EDGE Radio Access Network 502 (GERAN) is a 2G/2.5G technology. The UMTS Terrestrial Radio Access Network 504 (UTRAN) is a collective term for the NodeBs and Radio Network Controllers (RNCs) which make up the UMTS radio access network. The UMTS communications network is a 3G network; 3G networks can carry many traffic types and can span both real-time Circuit Switched (CS) and IP based Packet Switched (PS) data. The UTRAN contains at least one NodeB (base station) that is connected to at least one Radio Network Controller (RNC). An RNC provides control functionality for one or more NodeBs. A NodeB and RNC may also be the same device; however, typical implementations have a separate RNC located in a central location serving multiple NodeBs. The RNC together with its corresponding NodeBs are collectively termed the Radio Network Subsystem (RNS). There may be more than one RNS present per UTRAN.

Enhanced-UTRAN (E-UTRAN) 506 is the 3GPP Radio Access Network for LTE (3.9G) being standardized at the time of this disclosure. The proposed E-UTRA air interface uses Orthogonal Frequency Domain Access (OFDMA) for the downlink (from the BS to the UE) and Single Carrier Frequency Division Multiple Access (SC-FDMA) for the Uplink (UE to BS). The use of OFDM is more flexible in its use of spectrum than older Code Division Multiple Access (CDMA) based systems such as UTRAN. OFDM has a link spectral efficiency greater than CDMA, and may be combined with modulation formats such as 64 QAM, and techniques such as Multiple Input Multiple Output (MIMO). E-UTRA is expected to be considerably more efficient than W-CDMA with HSDPA and HSUPA. In practice, the transmitter and receiver of LTE devices are typically realized using IFFT and FFT digital signal processing.

Figure 5C:
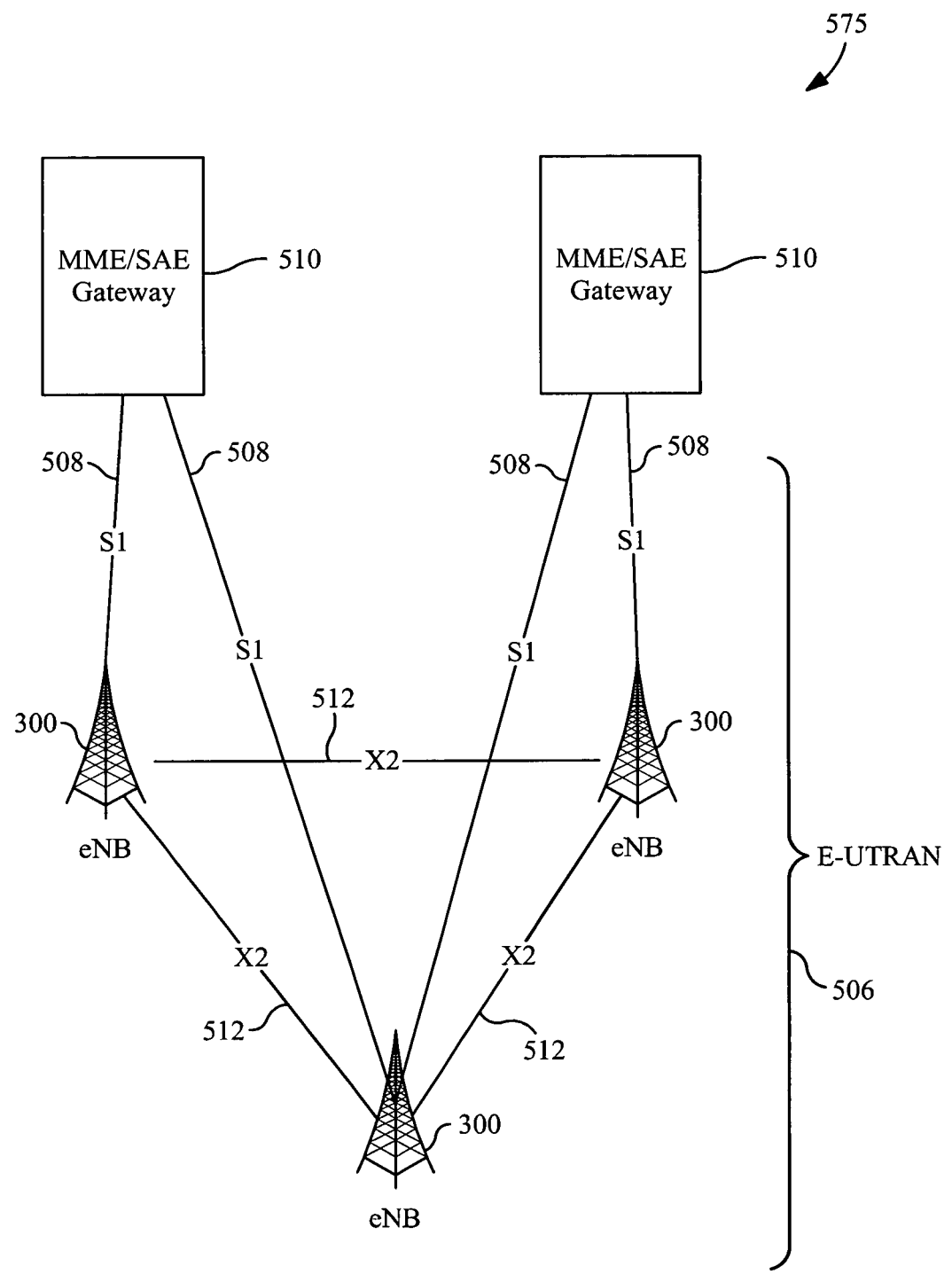
FIG. 5C is a graphical illustration of an exemplary E-UTRAN architecture comprising three eNodeBs, useful with the present invention.

In E-UTRAN, the eNodeBs control the majority of RNC functionality, and are generally more "intelligent" than legacy NodeBs of a UTRAN system. FIG. 5C shows a detailed view of an exemplary E-UTRAN architecture 575, comprising three eNodeBs 300. In LTE, eNodeBs are interconnected with each other by means of the X2 interface 512 of the type well known in the cellular arts. Furthermore, eNodeBs are connected by means of the S1 508 interface to the Evolved Packet Core (EPC) 510. The S1 interface (as defined by 3GPP) supports a many-to-many relation between the EPC and eNodeB. Theoretically, different operators may simultaneously operate the same eNodeB.

Figure 6:
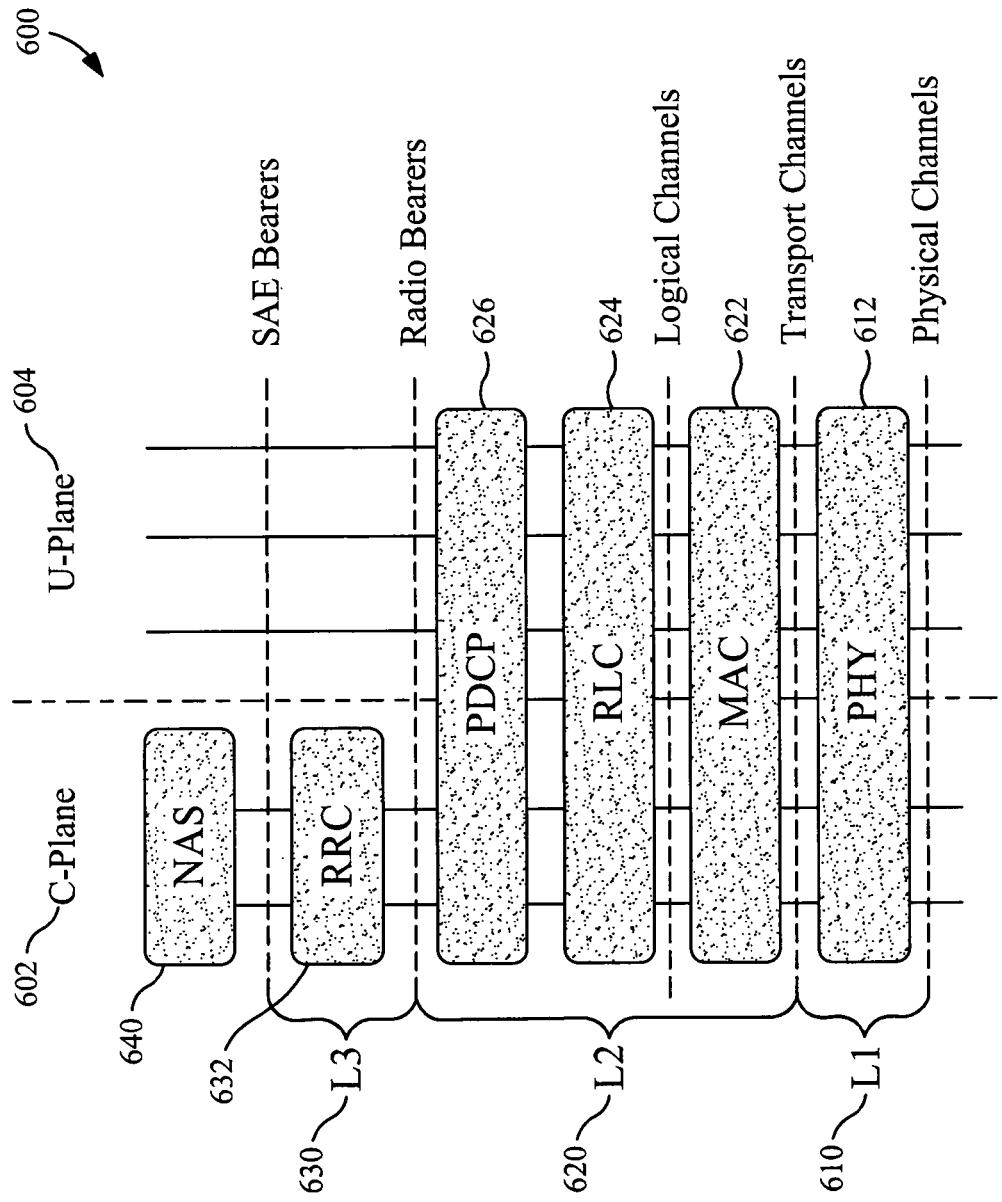
FIG. 6 is a graphical representation of one embodiment of an LTE protocol stack (including a Radio Resource Control (RRC) layer) useful with the present invention.

FIG. 6 illustrates an exemplary LTE protocol stack 600. The protocol stack can be divided into two complementary components, the c-plane 602 or control plane, and the u-plane 604 or user plane. The c-plane is utilized by the network operator to control and optimize network operations. The u-plane is its counterpart portion, residing within the UE software. The c-plane and u-plane are further "horizontally" divided into Layer 1 610, Layer 2 620, and Layer 3 630; each successive layer is modeled roughly on functionality described in the Open Systems Interconnection (OS) standard. These layers (610, 620, and 630) are generally grouped under Access Stratum (AS). Additionally shown is the Non-Access Stratum (NAS) Layer 640 which does not have an OSI equivalent, but refers to higher-level network functions (including but not limited to Call Control (CC), Session Management (SM), Supplementary Service (SS), Short Messaging Service (SMS), and Mobility Management (MM)). Core Network services such as authentication and registration are handled in NAS messaging.

Layer 2 is split into the following sub-layers: Medium Access Control (MAC) 622, Radio Link Control (RLC) 624 and Packet Data Convergence Protocol (PDCP) 626. The Service Access Points (SAP) between the physical layer 612 and the MAC sub-layer provide the transport channels. The SAPs between the MAC sub-layer and the RLC sub-layer provide the logical channels. The multiplexing of several logical channels (i.e., radio bearers) on the same transport channel (i.e., transport block) is performed by the MAC sub-layer in both uplink and downlink.

RRC Protocol Layer—

The Radio Resource Control (RRC) protocol layer 632 of Layer 3 630 of FIG. 6 is of particular importance to the embodiments of the invention described below. The main services and functions of the RRC sub-layer as it is used within the exemplary Multimedia Broadcast Multicast Service (MBMS) follows; i.e., notification, establishment, configuration, maintenance and release of Radio Bearers used in MBMS are now described.

The RRC sub-layer 632 is used to broadcast System Information in the downlink channels; the specification governing RRC sub-layer operations is the 3GPP TS 36.331: "E-UTRA Radio Resource Control (RRC) Protocol", v8.2.0 (Release 8) which is incorporated herein by reference in its entirety. System Information (SI) is embedded within RRC messages carrying a plurality of System Information-Blocks (SIBs). There may be more than one System Information RRC message transmitted with the same schedule (and/or periodicity). Each SIB contains a set of related system information parameters.

Two special versions of System Information (SI) RRC messages (System Information Master (SI-M), and System Information 1 (SI-1)), only carry a single SIB, namely the MIB and the SIB Type 1 respectively. The Master Information Block (MIB) includes a limited number of most frequently transmitted parameters. SIB Type 1 messages contain the scheduling information that indicates when the other System Information (SI) RRC messages are transmitted (such as their start times).

The SI-M message is mapped on the Broadcast Control Channel (BCCH) logical channel and carried on the Broadcast Channel (BCH), which is a downlink transport channel. All other System Information (SI) RRC messages including SI-1 are mapped on the Broadcast Control Channel (BCCH) logical channel and dynamically carried on the Downlink Shared Channel (DL-SCH) (another downlink transport channel). The SI-M has a periodicity of 40 ms, whereas SI-1 has a periodicity of 80 ms; both of which are transmitted on a fixed schedule. Reception of either BCH or DL-SCH channels does not require an active RRC connection. In fact, both channels are typically used while a UE is operating without a RRC connection (e.g. RRC_IDLE mode). Each System Information (SI) RRC message is transmitted in a periodically occurring (time domain) window, having a defined semi-static starting point and length, The SI-windows are non-overlapping, and the sizes of all SI-windows are the same. SI-1 configures the SI-window length and the transmission periodicity for the other System Information (SI) RRC messages. A SIB cannot be spread over multiple consecutive SI RRC messages. However, one SI RRC messages may comprise multiple SIBs (if they have the same periodicity).

The mapping of SIBs onto SI RRC messages is flexibly configured, and distributed via SI-1 messages.

System information (SI) changes can only occur during specific radio frames, which are referred to as modification periods. SI RRC messages (with the same content) may be scheduled for transmission a number of times within a modification period. The modification period boundaries are defined by System Frame Number (SFN) having modulo N. The value of N is set by current system information parameters. The aforementioned special SI RRC messages for the MIB and the SIB Type 1 messages have predefined schedules. Every UE can receive the publicly broadcast control messages, by using the standardized schedule.

The MIB uses a fixed schedule with a periodicity of 40 ms. The first transmission of the MIB is scheduled in subframe #0 of radio frames for which the System Frame Number (SFN) modulo 4 (four) equals 0 (zero). Each System Frame comprises 10 sub frames. Repeated transmissions of the MIB are scheduled in subframe #0 of all other radio frames.

The SIB Type 1 uses a fixed schedule with a periodicity of 80 ms. The first transmission of SIB Type 1 is scheduled in subframe #5 of radio frames for which the SFN modulo 8 (eight) equals 0 (zero), and repetitions are scheduled in subframe #5 of all other radio frames for which SFN modulo 2 (two) equals 0 (zero).

The scheduling of System Information (SD RRC messages other than SI-M and SI-1 is flexible, and dynamic scheduling techniques are commonly used. The UE may acquire the detailed time domain and/or frequency domain scheduling, as well as other information (such as the transport format used) of these System Information (SI) RRC messages from the Physical Downlink Control Channel (PDCCH). The PDCCH does not indicate which System Information (SI) RRC message is scheduled; instead, a single System Information Radio Network Temporary Identifier (SI-RNTI) is used for all different types of System Information (SI) RRC messages.

Figure 7:
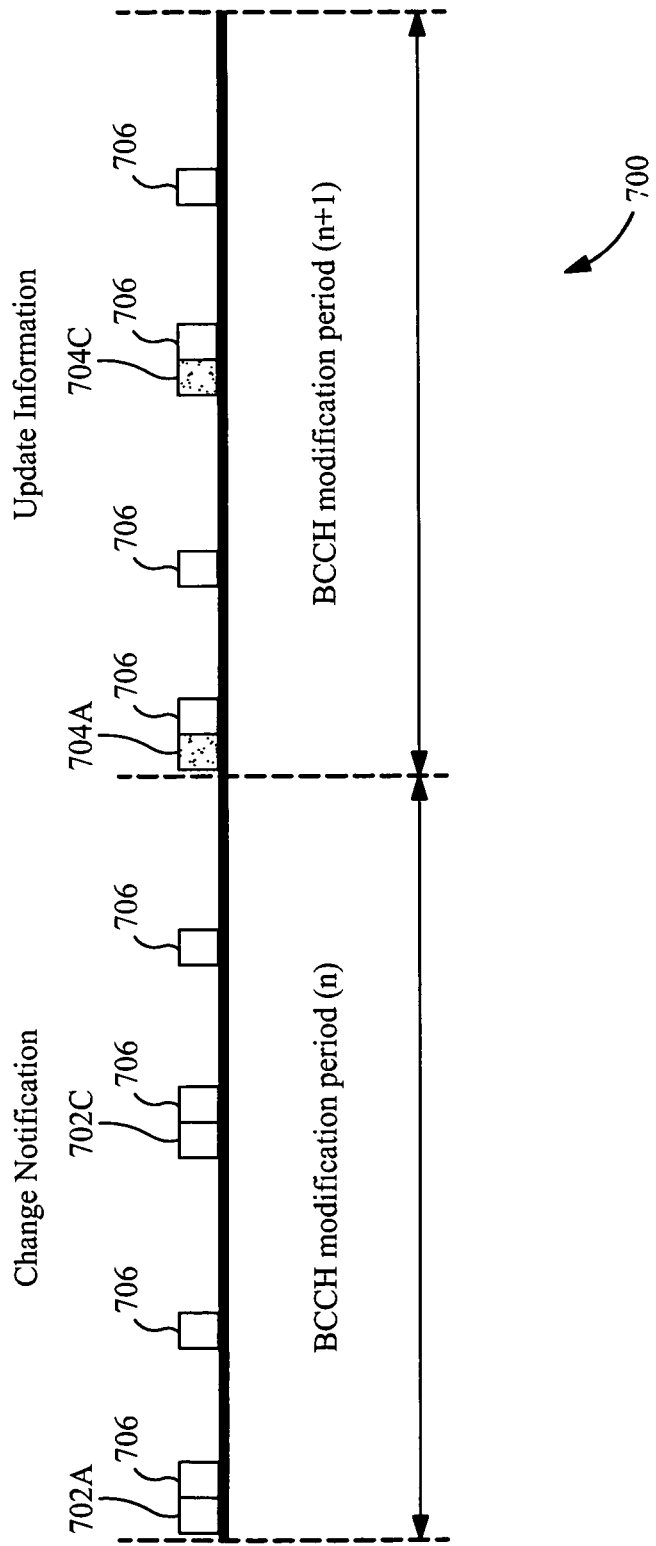
FIG. 7 is a graphical representation of one embodiment of a System Information parameter update process and timing (via the Broadcast Control Channel (BCCH)) according to the invention.

When the network changes current System Information parameters (in whole or in part), it must first notify the UE in the present modification period. The corresponding update to system information is broadcast in the next modification period. The correct timing for this process is illustrated in FIG. 7. Old system information 702A and 702C is replaced with new system information 704A and 704C. The frames 706 have a frame periodicity of modulo 4. The UE, upon receiving a change notification (e.g. 702A), will update itself with the current system information during the next corresponding modification period (e.g. 704A) boundary. There is a (short) period during which the UE does not have valid system information (the time between the notification 702 and the update 704).

For UEs in RRC_IDLE state, the PAGING message is used to indicate a system information change. UEs in RRC_CONNECTED state monitor the Physical Downlink Control Channel (PDCCH) periodically. Specifically, the UE monitors for system information updates (Connected Mode System Information Change Notification). Although the UE is informed about changes to system information, the system information update message is only an indication, and does not provide additional supplemental information (e.g., regarding which System Information (SI) RRC message has changed). The change notification mechanism is not used for system information that is only momentarily valid (e.g., no timer expiration).

The SI-1 message includes a value tag that indicates if a change has occurred in system information which is not represented in either SI-M (Master Information Block) or SI-1 (System Information Block Type 1). UEs may use this value tag for a wide range of reasons, such as a return to coverage, or to verify if previously acquired system information is still valid.

For certain embodiments of the present invention, the periodicity of the Master Information Block and System Information Block Type 1 is desirable to simplify receiver design for an LTE system. However, in alternative embodiments, the advantages provided by this simplified receiver design may be offset or outweighed by other factors, or may be entirely unnecessary in other implementations.

Table 1 below provides an overview of differences between SI-M, SI-1, and other SI.

TABLE 1

| System Information RRC Message | Content | Purpose | Periodicity | First Transmission | Repetitions |
|---|---|---|---|---|---|
| SI-M | One MIB | most essential physical layer info of the cell required to receive further system info | fixed, 40 ms | in subframe #0 of radio frame for which the SFNmod4 = 0 | in subframe #0 of all other radio frames |
| SI-1 | one SIB Type 1 | info relevant to cell access and scheduling of other SIBs | fixed, 80 ms | in subframe #5 of radio frame for which the SFNmod8 = 0 | in subframe #5 of all other radio frames for which SFNmod2 = 0 |
| SI | multiple SIBs (Type 2-8) | various purposes depending on SIB Type | flexible | in dynamically scheduled SI window; UE acquires details about scheduling from decoding SI-RNTI on PDCCH | |

Table 2 provides the content of the other System Information Block Types 2-8.

TABLE 2

| Other SIB Types | Content |
|---|---|
| 2 | Contains common and shared channel information. |
| 3 | Contains cell re-selection information, mainly related to the serving cell. |
| 4 | Contains information about the serving frequency and intra-frequency neighbouring cells relevant for cell re-selection. This includes cell re-selection parameters common for a frequency as well as cell specific re-selection parameters. |
| 5 | Contains information about other E-UTRA frequencies and inter-frequency neighbouring cells relevant for cell re-selection. This includes cell re-selection parameters common for a frequency as well as cell specific re-selection parameters. |
| 6 | Contains information about UTRA frequencies and UTRA neighbouring cells relevant for cell re-selection. This includes cell re-selection parameters common for a frequency as well as cell specific re-selection parameters. |
| 7 | Contains information about GERAN frequencies relevant for cell re-selection. This includes cell re-selection parameters for each frequency. |
| 8 | Contains information about CDMA2000 frequencies and CDMA2000 neighbouring cells relevant for cell re-selection. This includes cell re-selection parameters common for a frequency as well as cell specific re-selection parameters. |

Several exemplary embodiments of RRC message types which are modified to provide partial public access information are described herein; these include: (i) MIB, (ii) SIB Type 1, and (iii) SIB Type X, although it will be appreciated that the invention may be practiced through modification of other message types (RRC or otherwise) as well.

1. MIB/SIB Type 1—

As previously described, both MIB and SIB Type 1 messages are periodically transmitted. In one embodiment of the present invention, the SIB Type 1 indicator is used by the UE 400 to evaluate the current access to Cell 300. Similarly, the MIB can be modified to support access functionality.

FIG. 8A illustrates one exemplary SIB Type 1 message 804, as enhanced with Information Elements (IE) 808 according to one embodiment of the invention. The IE csg-partially-open is a Boolean encoding used to indicate whether a particular CSG Cell is partially open. When csg-partially-open is TRUE (i.e. binary one), the cell is partially open for public access. When csg-partially-open is FALSE (i.e. binary zero) the cell is not open for public access. The IE csg-open-services-info may include additional IEs such as: (i) service-type, (ii) service-details, and (iii) validity. IE service-type is optional, and can be used to inform a UE about which service types (e.g., MBMS) are offered for non-CSG-member UEs via the CSG Cell. It is encoded as an enumerated value in this example (e.g., MBMS, etc.), although other encoding schemes may readily be used.

The second IE of the sequence (service-details) is also optional, and may be used to give a more detailed listing comprising which services are offered to a non-CSG-member UE. For example, as shown, one such encoding scheme may comprise a content related identifier (e.g. sports, news, politics, music, etc.). Other alternate schemes may comprise service related information (e.g. encryption keys, formatting, codec requirements, etc.).

The third IE of the sequence (validity) is also optional, and may be used to specify timing restrictions regarding the partial open access of a CSG Cell (e.g., a validity period to limit the duration of open access in general or per service). For instance, a validity period could indicate a start time as well as an end time (or both), and could be specified either as an absolute value (example: valid until 27 Jun. 2008, 18:00 UTC) or a relative value (example: min10, min20, min30, min60, min90, unlimited, etc.). Other implementations will be readily recognized by those of ordinary skill given the present disclosure.

2. SIB Type X—

According to another embodiment of the invention, a new SIB Type (Type X, where X in a designated alphabetical and/or numeric character) carries information elements adapted to enable partial public access to a Cell 300. In one variant, a new System Information Block is defined which contains the aforementioned Information Elements (IE) for handling partially open access in CSG Cells.

Figure 8B:
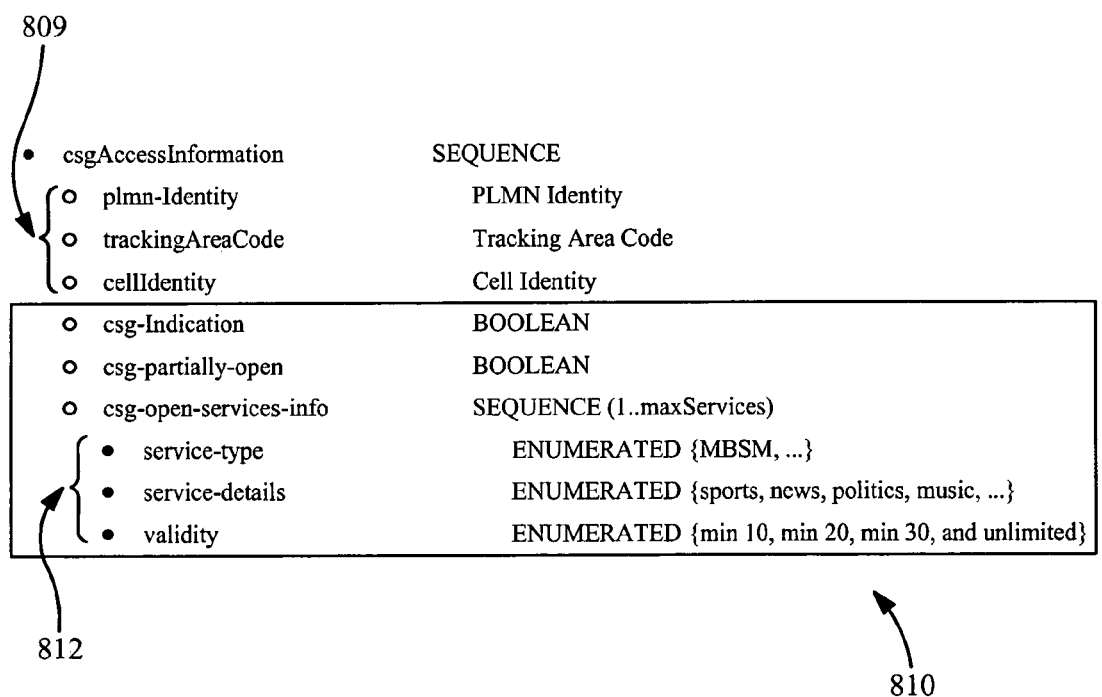
FIG. 8B illustrates another exemplary message format (i.e., SIB Type X) useful in implementing the present invention.

FIG. 8B illustrates one exemplary embodiment of SIB Type X, here named "SIB Type 9" although other names may be obviously used The exemplary SIB Type 9 of FIG. 8B comprises three IEs 809; i.e., (i) plmn-Identity, (ii) trackingAreaCode, and (iii) cellIdentity, to allow mapping of the information contained in this SIB to other cell specific information received in one of the other SIBs, such as SIB Type 1.

Furthermore, SIB Type 9 additionally comprises one or more IEs 810 enabling partial public access according to the invention. Similar in usage to SIB Type 1, csg-partially-open is used to indicate whether a particular CSG Cell is partially open. Also, csg-partially-open is encoded as a Boolean variable, although other schemes may be used. It is followed by a sequence of up to three more information elements (IE) 812 per service offering. These are all grouped under the IE csg-open-services-info, and are completely analogous to those previously described with respect to FIG. 8A above.

Exemplary LTE Network Operation—

Referring back to FIG. 1, an exemplary LTE System 100 provides service to UE 400B utilizing broadcasted System Information (SI) according to one embodiment of the invention described herein. In this example, Cell A 300, which is configured as a CSG Cell broadcasts its System Information (SI) comprising partial public access. The partial public access information is received, decoded and evaluated by all UEs (e.g., UTE 400A, UE 400B) in its cellular coverage.

Figure 9A:
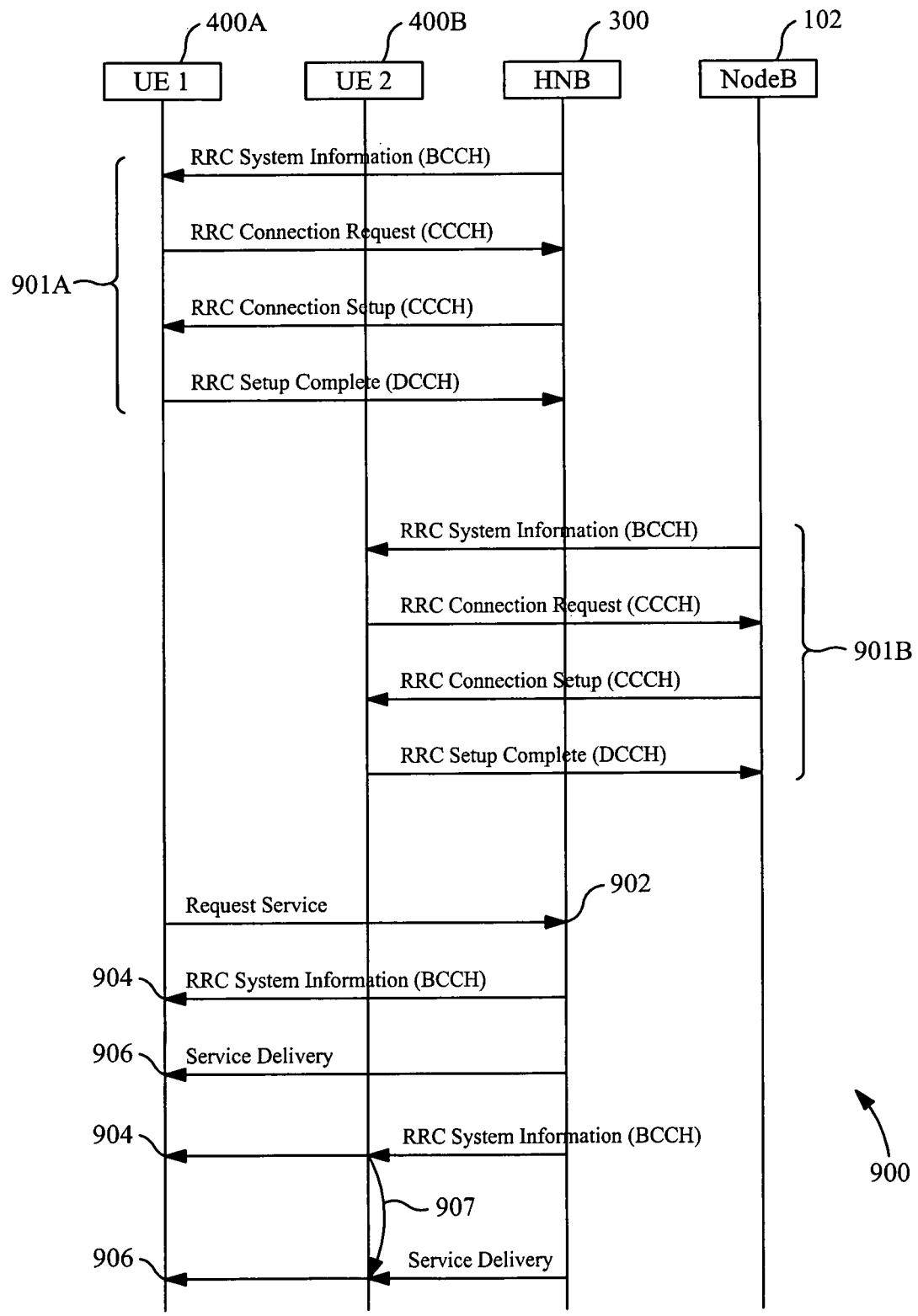
FIG. 9A is a graphical "ladder" representation of an exemplary message exchange between various nodes and UEs of a wireless network, according one embodiment of the invention.

FIG. 9A is a high-level RRC messaging ladder diagram 900 illustrative of one general principle of the invention, wherein a first UE requests a media service, and a second UE "piggybacks" onto the delivered media stream. The first UE 400A has the Cell ID of Cell A stored in its white list, and the first UE 400A is registered in the network or in the HNB 300 as member of the particular CSG Cell A, i.e. the first UE 400A, is allowed to use Cell A for all communication services offered. The second UE 400B does not have the Cell ID of Cell A stored in its white list and the second UE 400B is neither registered in the network nor in the HNB 300 as member of the particular CSG Cell A. Extant access techniques prohibit the second UE 400B from directly accessing CSG Cell A.

After establishing appropriate initial RRC connections 901A, 901B, HNB 300 provides service to the first UE 400A, and NodeB 112 provides service to the second UE 400B. As shown, the first UE 400A and second UE 400B have initialized their RRC connections at approximately the same time. It is appreciated that in typical use, connections 901A and 901B are not linked, and may occur at completely separate and distinct times. In fact, connection 901B may commonly occur after steps 902 and 904.

At time 902, the first UE 400A requests the delivery of a first service via a media delivery technique such as for instance MBMS (e.g., broadcast/multicast) previously described herein. The HNB and the first UE 400A perform negotiation and service initiation. It is further appreciated that negotiation and service initiation may include the HNB, the first UE 400A and one or more core network entities involving multicast or broadcast service centers or entities providing subscription data of the particular user of the first UE 400A or the first UE 400A capability data. Alternatively, the HNB 300 may be broadcasting free-running programming which the first UE 400A freely consumes.

At time 904, the HNB 300 broadcasts an indication of partial public service. In one embodiment, this broadcast is performed utilizing the aforementioned SIB Type 1 message, at a fixed transmission time. Alternatively, SIB broadcasts for SIB Type X (described above) may be scheduled periodically. The first UE 400A identifies one or more system parameters necessary for reception of requested services. At step 906, the first UE 400A processes the requested services provided by the HNB 300, based on decoded SIB type messages received in step 904.

The RRC system information broadcast at step 904 is received by all UEs within the service area of the HNB. The second UE 400B receives an indication of at least a subset of the plurality of services offered by HNB on the publicly broadcast SIB. The second UE 400B determines if the accessible services offered by the HNB are desired at step 907.

If the second UE 400B desires the broadcast content, then it executes step 906 and configures its radio receiver to consume the desired services. The first UE 400A and second UE 400B may simultaneously consume the desired media services without undue additional burden on the network infrastructure or the HNB.

Furthermore, it is appreciated that the second UE 400B may keep any RRC connections to the (macro) base station 102 (if present), while it is consuming the desired media services from the HNB.

Figure 9B:
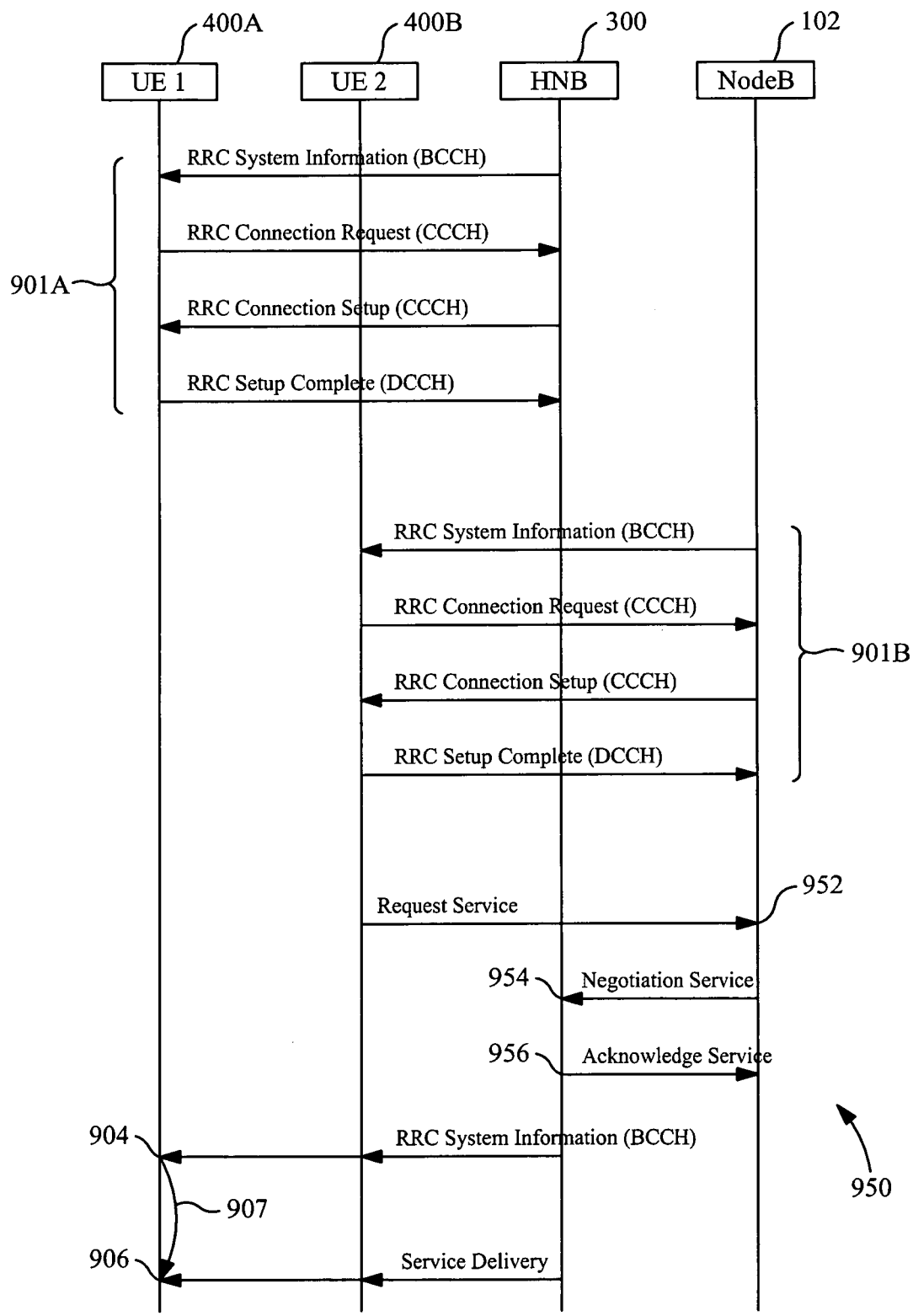
FIG. 9B is a graphical "ladder" representation of an exemplary message exchange between various nodes and UEs of a wireless network, wherein a "master" NodeB controls the service provision.

FIG. 9B is a high-level RRC messaging ladder diagram 950 illustrative of another general principle of the invention, wherein the Network Operator assumes control of an HNB to provision delivery of media services to one or more UE(s). Similar to the ladder diagram 900 of FIG. 9A, the first UE 400A has the Cell ID of Cell A stored in its white list; i.e., the first UE 400A, is allowed to use Cell A for all communication services offered. The second UE 400B does not have the Cell ID of Cell A stored in its white list, and therefore is prohibited from directly accessing Cell A. After establishing appropriate RRC connections, the HNB 300 provides service to the first UE 400A, and the NodeB 112 provides service to the second UE 400B.

At time 952, the second UE 400B requests the delivery of a first service via a transport technique (such as MBMS broadcast, a multicast, or even a unicast) from the base station 102. The request second UE 400B maintains an active RRC connection with the base station 102. The base station 102 determines that it is not available to service the second UE's 400B service request. Through neighbor cell measurement operations the base station 102 ascertains that second UE 400B is located in the coverage area of HNB 300. Alternatively, a higher layer network entity may determine that it is advantageous for the HNB to provide the requested services.

At a second time 954, the base station negotiates with the HNB 300 to provision the requested services. Alternatively, this may be performed by the aforementioned network entity. In some instances, negotiation may be omitted if HNB 300 already provides the requested service in Cell A, e.g. to the first UE 400A.

At a subsequent time 956, the base station 102 receives confirmation that another entity will provide the requested service to the second UE 400B (e.g., from the HNB 300, or from the higher layer network entity, or from both). The NodeB may optionally notify the second UE 400B of the existence of the provisioned service.

At a subsequent time 904, the HNB 300 broadcasts an indication of partial public service. In one embodiment, this broadcast is performed utilizing the aforementioned SIB Type 1 message, at fixed transmission time. Alternatively, SIB broadcasts for SIB Type X may be scheduled periodically. At this time 904, the second UE 400B receives an indication of at least a subset of the plurality of services offered by HNB, on the publicly broadcast SIB. Furthermore, it should be noted, that even though the first UE 400A has not explicitly requested the media service, it still receives the SIB broadcasts. Thus, at step 907, the first UE 400A may optionally consider receiving the media service as well.

At a later time 906, the second UE 400B configures its radio receiver and consumes the desired services. If the first UE 400A desires the broadcast content, then the first UE 400A configures its radio receiver to consume the desired services. Advantageously, both the first UE 400A and second UE 400B may simultaneously consume the desired media services without undue additional burden on the network infrastructure or the HNB.

The consumption of the desired service from HNB 300 does not require the second UE 400B to establish an RRC connection to the HNB 300. Accordingly, the second UE 400 B may maintain a RRC connection to NodeB 102 (i.e. RRC_CONNECTED) for telephony services, or camp on NodeB 102 (i.e. RRC_IDLE).

Business Methods and Rules—

It will be recognized that the foregoing network apparatus and methodologies may be readily adapted to various business models. For example, in one such model, a service provider/network operator may sell, lease, or freely provide (i.e., at no cost, as an incentive) an enhanced-capability femtocell such as that described previously herein to its customers. This helps advance the network operator's goals of greater customer satisfaction and enhanced network operation, as previously described herein.

In another business paradigm, certain strategic users could be selected to receive such enhanced-capability femtocells based on, inter alia, their subscription level, rate of usage, geographic location, etc., even in exchange for consideration from the network operator (e.g., a rebate or reduction of their monthly service fees if they operate the femtocell in accordance with the network provider policies).

The aforementioned network apparatus and methodologies may also be readily adapted for operation in accordance with an underlying business rules algorithm or "engine". This business rules engine may comprise for example a software application (and/or firmware or even hardware aspects), and is implemented in one embodiment as a separate entity at the Core Network, or alternatively within an existing entity residing at the Core Network or other network management process (NMP). As used herein, the term "application" refers generally to a computer program or unit of executable software that implements a certain functionality or theme. The term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

The rules engine is in effect a high-layer supervisory process which aids the network operator (or other interested party) in making operational decisions or resource allocations based on important criteria such as financial aspects, user experience enhancement, etc.

In one embodiment, the business rules engine is configured to take into account the revenue and/or profit implications associated with providing resources to one or more user-operated femtocells, so that the resource allocation to the femtocell does not negatively impact: (i) profitability or other goals (e.g., "user experience") on the broader wireless network, or (ii) the services that are able to be provided to users on the network via the geographically fixed base stations (macrocells). Accordingly, the exemplary business rules engine can modify the behavior of the system at specific steps of the methodologies described above in order to accomplish one or more economic or operational objectives for the network operator.

For instance, in one example, evaluation of the request from a femtocell for resources (e.g., frequency spectrum) may include an analysis of the incremental cost, revenue, and/or profit associated with the various allocation options (i.e., allocation to the requesting femtocell, or denial of the request and allocation to another femtocell, or a static base station).

These "business rules" may be imposed e.g., at time of resource request, and then maintained for a period of time (or until an event triggering a re-evaluation occurs), or alternatively according to a periodic model. In another variant, the party who owns the resources is tasked with making business-related decisions; i.e., the network operator makes decisions impacting the business relationship between the femtocell (owner) and the core network.

As yet another alternative, the femtocell may be equipped with logic (e.g., a business rules engine or component thereof, such as a client portion of a distributed application) that is configured to analyze and make business or operational decisions relating to the business model between the client device (e.g., UE) and the femtocell. For instance, the femtocell may preferentially process or allocate resources to certain requesting users based on their status (e.g., as existing subscribers of the service provider associated with the core network, the type of service requested and revenue/profit implications associated therewith, etc.)

In another example, the HNB operator may desire to publicly offer a subset of services and capabilities (e.g. broadcasting advertisements, basic commercial service offerings, etc.), but also maintain separate higher-priority services for private or CSG-only usage. Such services may or may not require RRC-connection assignments. Broadcast advertisements for specific location-based services (e.g. current meal specials at a local restaurant, etc.) are an example of a possible RRC connection-less use-case. Multicast data services, and automated services (e.g., automated museum guide/docent services provided to a smart phone, such as an iPhone™) are examples of possible limited RRC connection based use cases. In the aforementioned examples, it is noted that the current prior art "white list" methodology is insufficient, as current CSG Cell access protocols only provide for allowing, or rejecting cellular access.

Myriad other schemes for implementing dynamic allocation of resources will be recognized by those of ordinary skill given the present disclosure.

It will be appreciated that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of optimizing resource allocation within a public cellular network, and quality of service within a private cellular network having a femtocell and a private group approved for access to the femtocell, wherein a user terminal is connected to the public cellular network via a dedicated connection to a base station, the method comprising:

selectively providing services to the user terminal that is not a member of the private group via the femtocell, wherein the dedicated connection between the user terminal and the base station is a radio resource control (RRC) layer connection that is maintained during the providing of the services;

wherein:

the act of selectively providing services improves at least one aspect of service quality for the user terminal over that when the services are provided by the base station; and the public cellular network comprises a Universal Mobile Telecommunications System (UMTS) or Long Term Evolution (LTE) compliant network.

2. The method of claim 1, wherein the at least one aspect of service quality comprises cellular device battery duration.

3. The method of claim 1, wherein the at least one aspect of service quality comprises wireless link quality.

4. The method of claim 1, wherein the femtocell comprises a Home evolved Node B (HeNB).

5. A method of operating a closed group asset of a wireless network to provide one or more services to user terminals which are not part of a closed group, the method comprising:

identifying one of the one or more services to be provided to a user terminal which is not associated with the closed group, the user terminal connected to the wireless network via a base station; and delivering the identified one or more services to the user terminal without establishing a new dedicated radio resource control (RRC) layer connection to the user terminal, and without breaking a dedicated RRC layer connection between the base station and the user terminal, during the delivery;

wherein the utilization of a previously established RRC layer connection obviating a need for the new dedicated RRC layer connection between the closed group asset and the user terminal.

6. The method of claim 5, wherein the act of delivering without establishing the new dedicated RRC layer connection comprises delivering without establishing a second RRC layer connection dedicated to the user terminal.

7. The method of claim 6, wherein the act of delivering comprises providing access via the closed group asset to an existing Multimedia Broadcast Multicast Service (MBMS) broadcast via the previously established RRC layer connection to at least the user terminal.

8. The method of claim 5, wherein the act of delivering the identified one or more services to the user terminal improves at least one aspect of service quality for the user terminal compared to that when the identified one or more services are not provided.

9. The method of claim 8, wherein the at least one aspect of service quality comprises cellular device battery duration.

10. The method of claim 8, wherein the at least one aspect of service quality comprises wireless link quality.

11. The method of claim 5, wherein the closed group asset comprises a Home evolved Node B (HeNB), and the wireless network comprises a Long Term Evolution (LTE) compliant network.

12. A method of operating a closed group asset of a wireless network so as to provide one or more services to a user terminal which is not part of a closed group, the method comprising:

classifying the one or more services according to a classification scheme;

providing one of the one or more services to the user terminal which is not associated with a member of the closed group, the at least one user terminal connected to the wireless network via a dedicated radio resource control (RRC) layer connection to a base station; and serving or not serving the classified one or more services to the user terminal based at least in part on the classification scheme;

wherein the act of serving comprises providing the classified one or more services using the base station, the use of the base station obviating a need to break the dedicated RRC layer connection between the base station and the user terminal, and without establishing a new dedicated RRC layer connection between the closed group asset and the user terminal, during the act of serving.

13. The method of claim 12, wherein the closed group asset comprises a femtocell, and the wireless network comprises a cellular network.

14. The method of claim 13, wherein the femtocell comprises a Home Node B (HeNB), and the cellular network comprises a Universal Mobile Telecommunications System (UMTS) compliant network.

15. The method of claim 13, wherein the femtocell comprises a Home evolved Node B (HeNB), and the cellular network comprises a Long Term Evolution (LTE) compliant network.

16. The method of claim 12, wherein the classification scheme comprises a scheme having at least private and partial public access levels, and the act of serving or not serving comprises serving when the classified one or more services comprise services classified according to the partial public access level.

17. The method of claim 12, wherein the act of providing the classified one or more services using the base station comprises providing access to an existing Multimedia Broadcast Multicast Service (MBMS) compliant broadcast to at least the user terminal.

18. The method of claim 12, wherein the method further comprises broadcasting or multicasting information to the at least one user terminal which is not part of the closed group, as well as users that are part of the closed group.

19. The method of claim 18, wherein the broadcasting or multicasting of the information to the user terminal which is not part of the closed group comprises broadcasting or multicasting a listing of available services using at least an extant system information (SI) message.

20. The method of claim 18, wherein the multicasting of the information to the user terminal which is not part of the closed group comprises multicasting one or more of:

information indicating whether a network resource is partially open to user terminals which are not part of the closed group;

a listing of service types offered for the user terminals which are not part of the closed group; and information about one or more schedules regarding partial open access for the user terminals which are not part of the closed group.

\* \* \* \* \*